United States Patent [19]

Kamishima

[11] Patent Number: 5,270,708
[45] Date of Patent: Dec. 14, 1993

[54] ACCIDENT INFORMATION PROVIDING SYSTEM FOR AUTOMOTIVE VEHICLE

[75] Inventor: Hiroyuki Kamishima, Yokohama, Japan

[73] Assignee: Nissan Motor Co., Ltd., Yokohama, Japan

[21] Appl. No.: 853,438

[22] Filed: Mar. 18, 1992

[30] Foreign Application Priority Data

Apr. 8, 1991 [JP] Japan .................. 3-075392

[51] Int. Cl.⁵ ........................... G08G 1/123
[52] U.S. Cl. .................... 340/995; 340/905; 364/436
[58] Field of Search .......... 340/905, 903, 901, 995, 340/990, 988, 435; 455/186.1, 228; 364/436, 424.01, 443, 449, 424.04

[56] References Cited

U.S. PATENT DOCUMENTS

| | | | |
|---|---|---|---|
| 4,519,469 | 5/1985 | Hayashi et al. | 340/903 |
| 5,068,654 | 11/1991 | Husher | 340/903 |
| 5,091,726 | 2/1992 | Shyu | 340/903 |
| 5,095,532 | 3/1992 | Mardus | 340/905 |
| 5,146,219 | 9/1992 | Zechnall | 340/905 |

FOREIGN PATENT DOCUMENTS 53-136408 11/1978 Japan .

Primary Examiner—Brent Swarthout
Attorney, Agent, or Firm—Foley & Lardner

[57] ABSTRACT

The current vehicle position is detected by a position and orientation sensor 101. Past accident data related to roads ahead of the detected position are extracted from an accident data storing unit 109. The vehicle driving conditions (e.g. right/left turn, speed, etc.) are detected by a right/left turn sensor 105 and a speed sensor 102. The possibility of occurrence of an accident similar to the extracted past accident is discriminated on the basis of the detected vehicle driving conditions. An accident alarm is generated through a speech outputting unit 107, for example, if an accident occurrence possibility exists.

16 Claims, 23 Drawing Sheets

ACCIDENT INFORMATION PROVIDING SYSTEM FOR AUTOMOTIVE VEHICLE

BACKGROUND OF THE INVENTION

1. Field of the Invention

The present invention relates to an accident information providing system for an automotive vehicle, and more specifically to an accident information providing system for calling a driver's attention to vehicle driving, when the vehicle comes close to spots at which many traffic accidents have arisen, in accordance with past statistical data on traffic accidents.

2. Description of Prior Art

In recent automotive vehicles, various travel information is provided for the driver in the form of speech or display so that the driver can drive the vehicle more safely and comfortably, as disclosed in Japanese Published Unexamined (Kokai) Pat. Appli. No. 53-136408, for instance.

The above-mentioned travel information includes road guidance information to a destination, intersection information, road snarl information, etc. which may be effective for the driver to smoothly drive the vehicle to a destination.

SUMMARY OF THE INVENTION

The object of the present invention is to provide an accident information providing system for providing a possibility of traffic accident occurrence to a driver in addition to other travel information, so that the driver can drive the vehicle more safely and speedily.

To achieve the above-mentioned object, the accident information providing system according to the present invention comprises: (a) vehicle position and direction detecting means for detecting current vehicle traveling position and direction; (b) accident data storing means for storing past traffic accident data under classification of occurrence spots and causes; (c) accident data extracting means for extracting past accident data related to roads ahead of a current travel road, determined on the basis of the detected current vehicle traveling position and direction, from said storing means; (d) drive condition detecting means for detecting vehicle driving conditions; (e) accident occurrence discriminating means for discriminating a possibility of occurrence of an accident similar to the accident extracted by said extracting means, on the basis of vehicle driving conditions detected by said drive condition detecting means; and (f) alarming means for providing an accident-related alarm to a driver when said discriminating means discriminates the possibility of accident occurrence.

In the system according to the present invention, past traffic accident data related to roads ahead of the currently travelled road are extracted from the accident data storing means; the possibility of accident occurrence is checked on the basis of the extracted past accident data and the current vehicle driving conditions (e.g. turning, speed, etc.); and an accident-related information is outputted where necessary.

Further, it is preferable that the system further includes: (a) map data storing means for storing road map information related to roads and intersections; (b) travel route recording means for recording the number of travels through the roads and intersections recorded in said map data storing means, on the basis of the detected current vehicle traveling positions and directions; and (c) alarm necessity discriminating means for comparing the recorded number of travels with a predetermined value to discriminate the lack of a need of providing an accident-related alarm to a driver when the recorded travel number exceeds the predetermined value.

In the system according to the present invention, when the vehicle often travels along the same travel route, because the driver may well know the accident occurrence situation, it is preferable to disable the accident-related information from being outputted, for prevention of repeated troublesome accident information.

Further, it is also preferable that the system further includes: another vehicle detecting means for detecting the traveling position and direction of another vehicle traveling in the vicinity of the vehicle, the other vehicle detecting means discriminating a possibility of occurrence of a contact accident between the vehicle and another vehicle traveling in the same direction, and providing an alarm to a driver when the distance between the two vehicles is less than a predetermined value.

In the system according to the present invention when another vehicle detecting means (e.g. communicating unit) is further included, it is possible to provide a possibility of occurrence of a contact accident between the drivers own vehicle and another vehicle to the driver, for providing a more reliable accident prevention information.

Further to achieve the above-mentioned object, the method of providing accident information to a driver according to the present invention comprises the steps of: (a) calculating current vehicle position and current vehicle travel route on the basis of map data and travel position and direction sensor outputs; (b) estimating vehicle travel direction; (c) referring to accident data related to the estimated vehicle travel direction to check whether a frequent accident occurrence point exists ahead of the current vehicle position; (d) if it exists, referring to accident classification to check the classified accident; (e) detecting vehicle driving conditions; (f) checking whether the detected vehicle driving conditions are dangerous on the basis of the past classified accident; and (g) if dangerous, outputting an accident alarm.

If the classified accident is a right/left turn accident, the method comprises the steps of (a) detecting whether a flasher lamp is turned on; (b) if turned on, checking whether the turned-on flasher lamp direction matches the turn accident direction; and (c) if it matches, outputting a turn-accident alarm. If the classified accident is a collision accident, the method comprises the steps of (a) referring to a regulation speed; (b) detecting current vehicle speed; (c) checking whether the current speed is higher than the regulation speed; and (d) if higher, outputting an overspeed alarm and a collision accident alarm. If the classified accident is a walker rush-out accident, that is, an accident where a pedestrian or walker rushes out or walks into the road, the method comprises the steps of vehicle speed; (c) checking whether the current speed is higher than the regulation speed; and (d) if higher, outputting an overspeed alarm and a walker rush-out accident alarm.

DETAILED DESCRIPTION OF THE PREFERRED EMBODIMENTS

Embodiments of the accident information providing system according to the present invention will be described hereinbelow with reference to the attached drawing.

Figure 1:
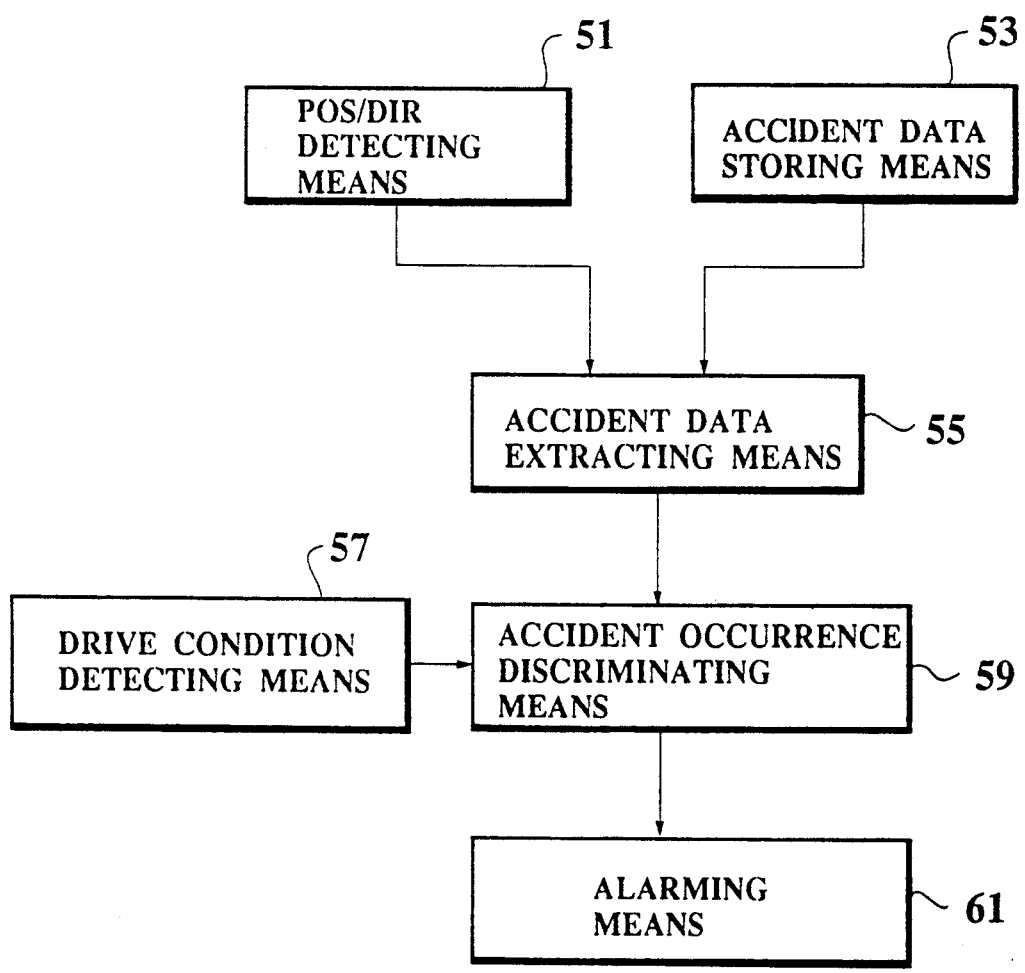
FIG. 1 is a schematic block diagram showing a first embodiment of the accident information providing system according to the present invention.

FIG. 1 shows a first embodiment of the present invention. In the drawing, an accident information providing system for an automotive vehicle comprises: vehicle position and direction detecting means 51 for detecting current vehicle traveling position and direction; accident data storing means 53 for storing past traffic accident data under classification of occurrence spots and accident causes; accident data extracting means 55 for extracting past accident data related to roads ahead of a current travel road, determined on the basis of the detected current vehicle traveling position and direction, from said storing means; drive condition detecting means 57 for detecting vehicle driving conditions; accident occurrence discriminating means 59 for discriminating a possibility of occurrence of an accident similar to the accident extracted by said extracting means, on the basis of vehicle driving conditions detected by said drive condition detecting means; and alarming means 61 for providing an accident-related alarm to a driver when said discriminating means discriminates the possibility of accident occurrence.

Figure 2:
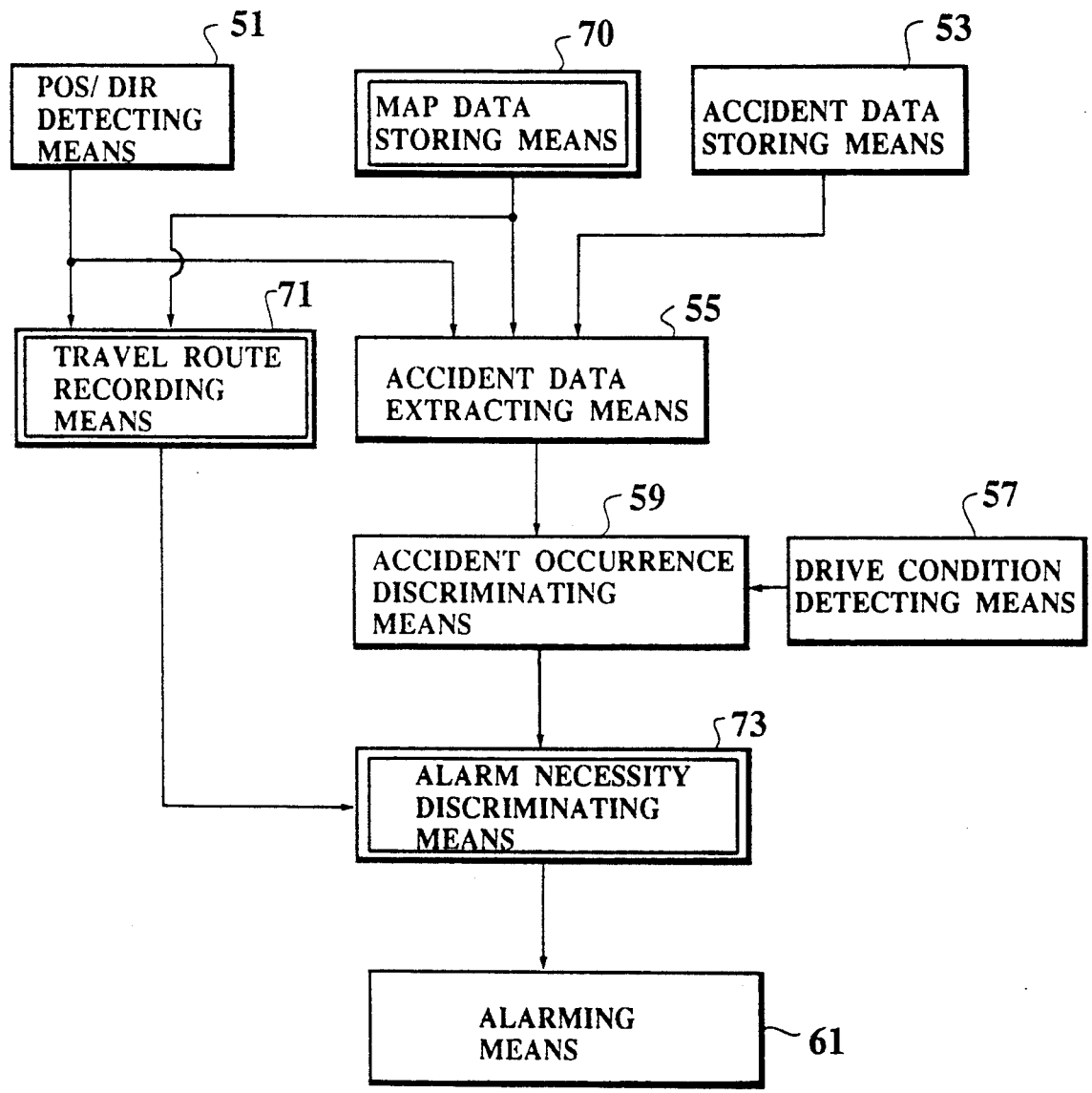
FIG. 2 is a schematic block diagram showing a second embodiment of the accident information providing system according to the present invention.

FIG. 2 shows a second embodiment of the present invention. In the drawing, an accident information providing system further comprises map data storing means 70 for storing road map information related to roads and intersections; travel route recording means 71 for recording the number of travels through the roads and intersections recorded in said map data storing means, on the basis of the detected current vehicle traveling positions and directions; and alarm necessity discriminating means 73 for comparing the recorded number of travels with a predetermined value to discriminate the lack of a need of providing an accident-related alarm to a driver when the recorded travel number exceeds the predetermined value.

Figure 3:
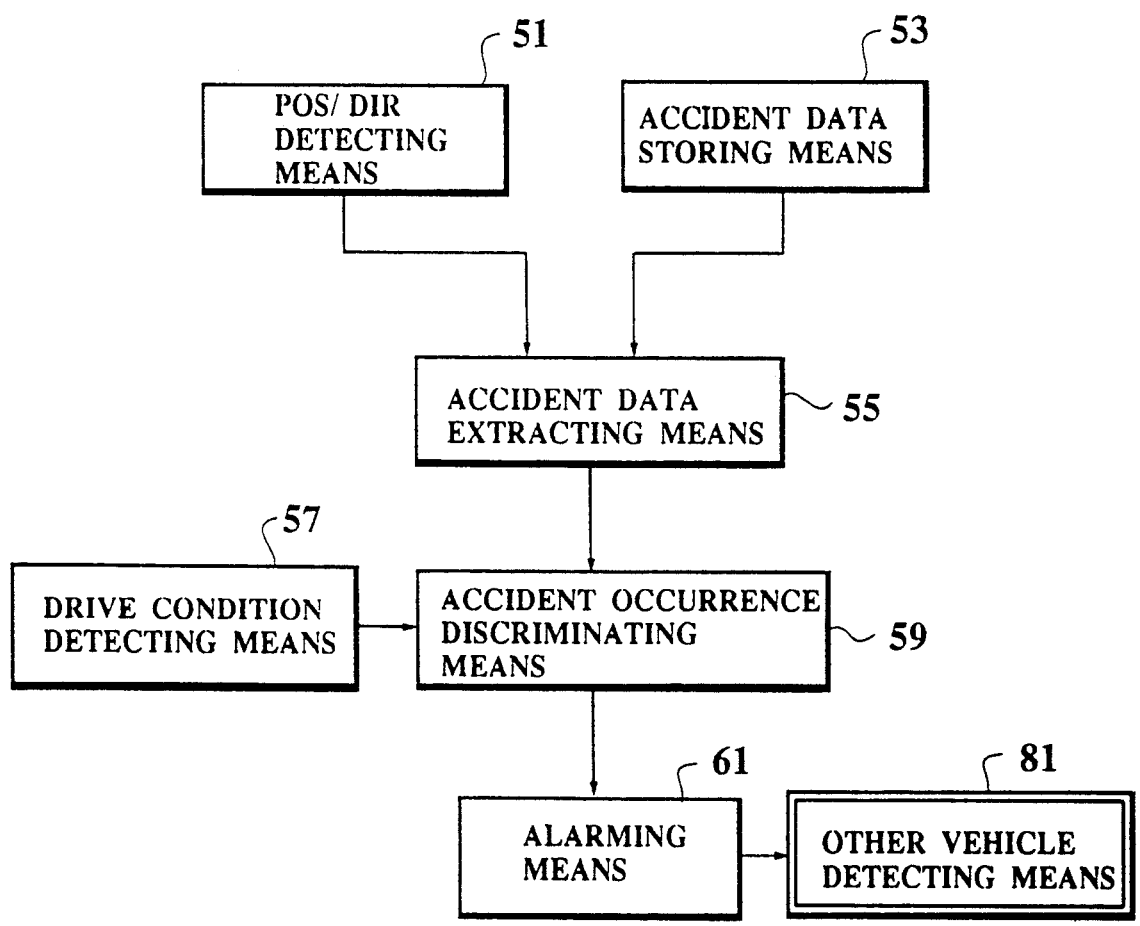
FIG. 3 is a schematic block diagram showing a third embodiment of the accident information providing system according to the present invention.

FIG. 3 shows a third embodiment of the present invention. In the drawing, an accident information providing system further comprises other vehicle detecting means 81 for detecting traveling position and direction of another vehicle traveling in the vicinity of the vehicle, the other vehicle detecting means discriminating a possibility of occurrence of collision between the vehicle and another vehicle, and providing an alarm to a driver when the distance between the two vehicles is less than a predetermined value according to vehicle speed.

Figure 4:
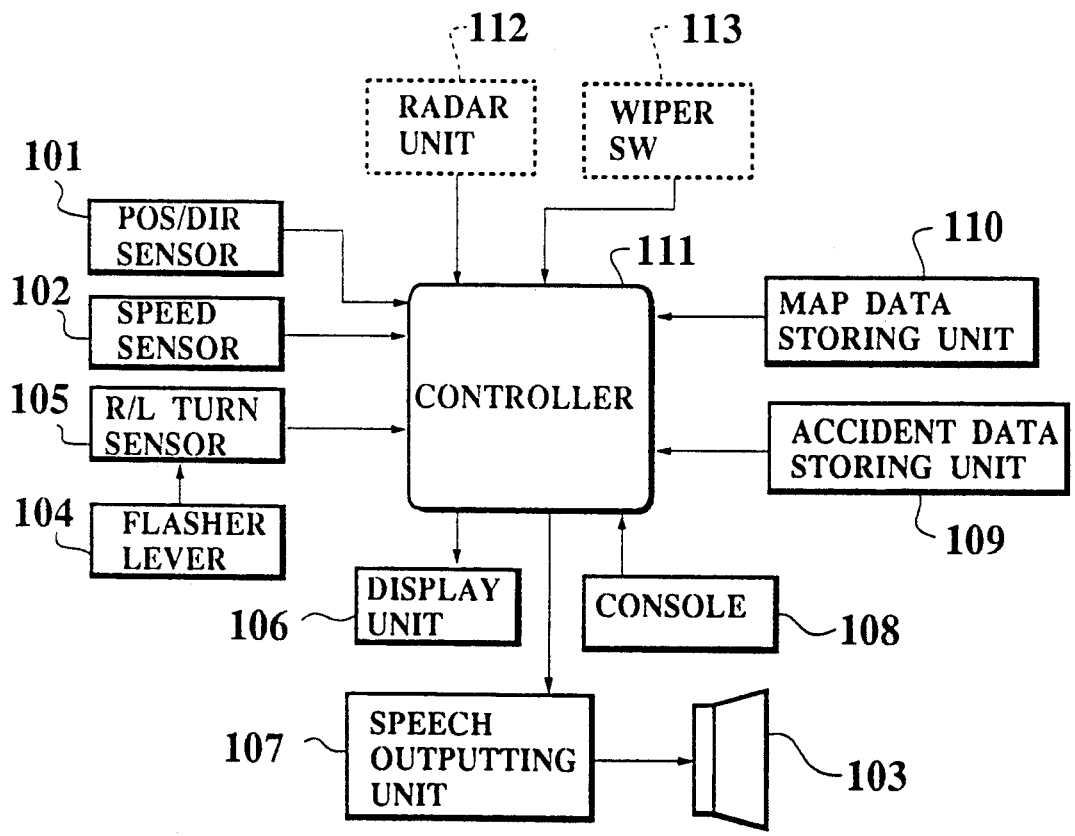
FIG. 4 is a more practical block diagram showing a first embodiment of the accident information providing system according to the present invention.

FIG. 4 is a more practical block diagram showing a configuration of the first embodiment of the accident information providing system according to the present invention, which is mounted on an automotive vehicle. When the vehicle comes close to a spot at which many traffic accidents have occurred the possibility of accident occurrence according to the vehicle driving condition is indicated to the driver to stimulate the driver's attention. The system comprises, in particular a statistical accident data storing unit (accident data storing means) 109 for storing statistical data of past accidents under classification according to occurrence spots, accident causes, the number of accident occurrences, etc; and a map data storing unit (map data storing means) 110 for storing various road map information with respect to intersections, roads connected to intersections, road widths and regulation speeds thereof, etc. These storing units 109 and 110 are connected to a controller 111 (including an arithmetic unit) for controlling the overall operations of the system. In practice, however, these units 109, 110 and 111 can be configured by a microcomputer including a CPU, a ROM, a RAM, etc.

The system further comprises a position and direction sensor (position and direction detecting means) 101 for detecting the current vehicle position and travel direction (e.g. geomagnetism sensor, vehicle wheel speed difference sensor, GPS, etc.); a vehicle speed sensor 102 and a right and left turn sensor 105 for detecting vehicle right and left turns (drive condition detecting means); a display unit (alarming means) 106 for displaying various accident information; a speech outputting unit (alarming means) 107 connected to a speaker 103 for outputting various information acoustically (e.g. speech synthesizer, CD-ROM, etc.); and a console 108 for activating or switching the display unit 106 or the speech outputting unit 107 or for entering various information by a driver.

Here, the above-mentioned GPS is an abbreviation of Global Positioning system, by which the vehicle can detect the current vehicle position and the vehicle speed by receiving radio waves transmitted by a plurality (three or four) of communication satellites.

Further, a flasher lever 104 is connected to the right and left turn sensor 105. Therefore, when the driver actuates this flasher lever 104 toward the right or left, the vehicle right and left turns can be detected by the right and left turn sensor 105. Further, the statistical accident data storing unit 109 and the map data storing unit 110 can be formed by use of storing media such as a CD-ROM, magnetic disk, magnetic tape, optical disk, optical tape, etc. Further, it is possible to obtain these map and accident data transmitted from a fixed station (e.g. a traffic information center) through a radio communicating unit, instead of the storing units 109 and 110.

Figure 5:
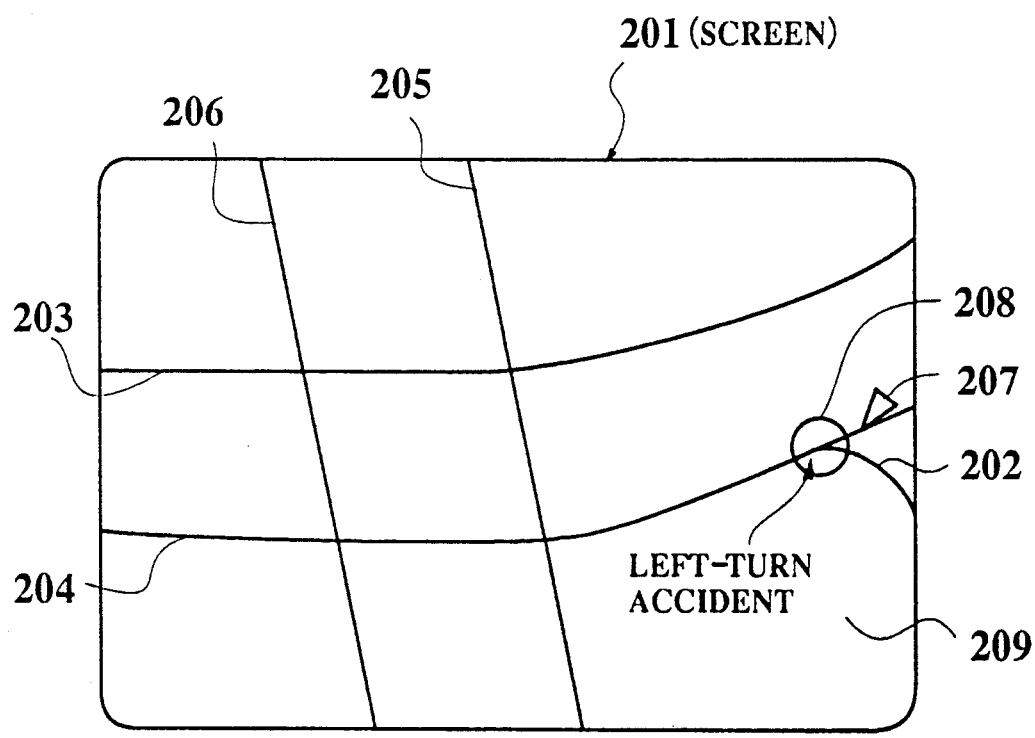
FIG. 5 is an illustration showing a display screen of a display unit incorporated in the system shown in FIG. 4 to display actual various traffic information.

FIG. 5 shows an example of an information screen 201 displayed by the display unit 106. In the drawing, a number of roads 202, 203, 204, 205 and 206 are shown. Further, an intersection between the roads 202 and 204 is enclosed by a circle 208, which indicates a spot at which many accidents have arisen. In addition, an accident classification such as "LEFT TURN ACCIDENT" 209 is displayed under the intersection 208. This accident classification 209 can be displayed by use of a symbol or a figure instead of characters.

With reference to the attached flowcharts, the operation of the accident information providing system according to the present invention will be described hereinbelow. The various operations are all executed by the controller 111 in accordance with programs stored therein.

Figure 6:
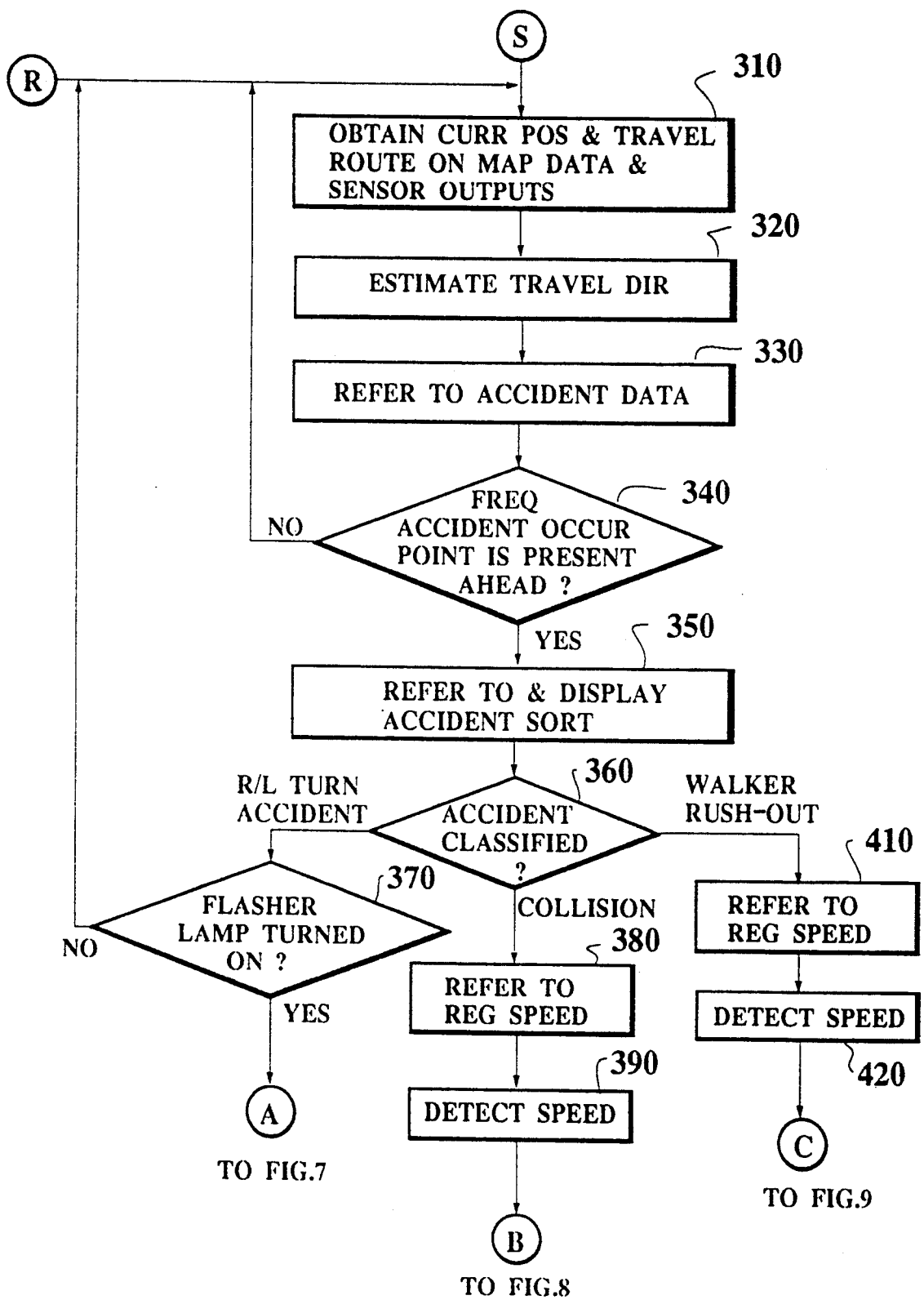
FIGS. 6 to 9 are flowcharts for assistance in explaining the function of the first embodiment of the system shown in FIG. 4, FIGS. 10 to 12 are flowcharts for assistance in explaining the function of several modifications of the first embodiment of the system according to the present invention.

In FIG. 6, the control first receives signals from the position and direction sensor 101 and the vehicle speed sensor 102 during vehicle traveling, and calculates the current vehicle position and the travel route on the basis of these sensor signals and map data stored in the map data storing unit 110 (in step 310). Further, the control estimates the vehicle travel direction on the basis of the past travel route (in step 320). Further, the control refers to statistical accident data stored in the statistical accident data storing unit 109 (in step 330), and checks the presence or absence of frequent accident occurrence points on roads ahead of the road along which the vehicle is now traveling, on the basis of the calculated vehicle position and the estimated direction (in step 340).

In the above step 330, it is also possible to obtain the latest statistical accident data transmitted from the traffic information center (fixed station) with a communication apparatus, whenever the ignition key is turned on, without referring to the accident data storing unit 109.

In the case of the absence of frequent accident occurrence points, control returns to the step 310. In the case of the presence of frequent accident occurrence points; however, the control displays a frequent accident occurrence point (e.g. 208 in FIG. 5) and an accident classification (e.g. 209 in FIG. 5) on the display screen 201 of the display unit 106, with reference to data read out of the accident data storing unit 109 (in step 350).

The control further discriminates the accident classification; that is, whether the accident is right and left turn accident, front-end or rear-end collision, or walker rush-out accident (in step 360). A walker rush-out accident is an accident where a pedestrian or walker rushes out or walks into the road. When the discriminated result is right and left turn accident, the control checks whether the vehicle is now being turned to the right or left by detecting the flasher turn-on direction with the right and left turn sensor 105 (in step 370). If the flasher is not turned on, the control discriminates that the vehicle is traveling on a straight line, and therefore returns to the step 310, because the possibility of accident occurrence in straight vehicle traveling is very low. On the other hand, if the flasher is being turned on, control proceeds to FIG. 7 to check whether the turn direction of the vehicle is the same as that of the classified accident on the basis of the turn-on direction of the flasher (in step 430). If the vehicle turning direction is not the same as that of the past classified accident, control returns to step 310, because the possibility of accident occurrence is very low. However, if the vehicle turning direction is the same as that of the past accident, control generates an alarm such as "FREQUENT RIGHT (or LEFT) TURN ACCIDENT OCCURRENCE POINT" through the speech outputting unit 107 (in step 440), returning to the step 310.

If the discriminated result of the accident classification in step 360 of FIG. 6 a is front-end or rear-end collision accident, the control refers to the regulation speed stored in the accident data storing unit 109 (in step 380), and further detects the vehicle speed by the vehicle speed sensor 102 (in step 390). Thereafter, control proceeds to steps shown in FIG. 8 in order to compare the current vehicle speed with the regulation speed (in step 450). If the vehicle speed is lower than the regulation speed, control immediately generates an alarm "FREQUENT COLLISION ACCIDENT OCCURRENCE POINT" through the speech outputting unit 107 (in step 470), returning to the original step 310. If the vehicle speed is higher than the regulation speed (in step 450), control first generates an alarm "ATTENTION TO OVERSPEED" through the speech outputting unit 107 (in step 460) and additionally the alarm "FREQUENT COLLISION ACCIDENT OCCURRENCE POINT" (in step 470), returning to the original step 310. Here, the collision includes both front-end and rear-end collisions.

If the discriminated result of the accident classification in step 360 of FIG. 6 is walker rush-out accident, the control refers to the regulation speed stored in the accident data storing unit 109 (in step 410), and further detects the vehicle speed by the vehicle sensor 102 (in step 420). Thereafter, the control proceeds to steps shown in FIG. 9 in order to compare the current vehicle speed with the regulation speed (in step 490). If the vehicle speed is lower than the regulation speed, control immediately generates an alarm "FREQUENT WALKER RUSH-OUT ACCIDENT OCCURRENCE POINT" through the speech outputting unit 107 (in step 510), returning to the original step 310, If the vehicle speed is higher than the regulation speed (in step 490), the control generates an alarm "ATTENTION TO OVERSPEED" through the speech outputting unit 107 (in step 500) and additionally the alarm "FREQUENT WALKER RUSH-OUT ACCIDENT OCCURRENCE POINT" (in step 510), returning to the original step 310.

Further, it is also possible to change the above-mentioned alarm "FREQUENT ACCIDENT OCCURRENCE POINT" to another alarm such as "ATTENTION, NOW APPROACHING FREQUENT ACCIDENT OCCURRENCE POINT", for instance.

Figure 8:
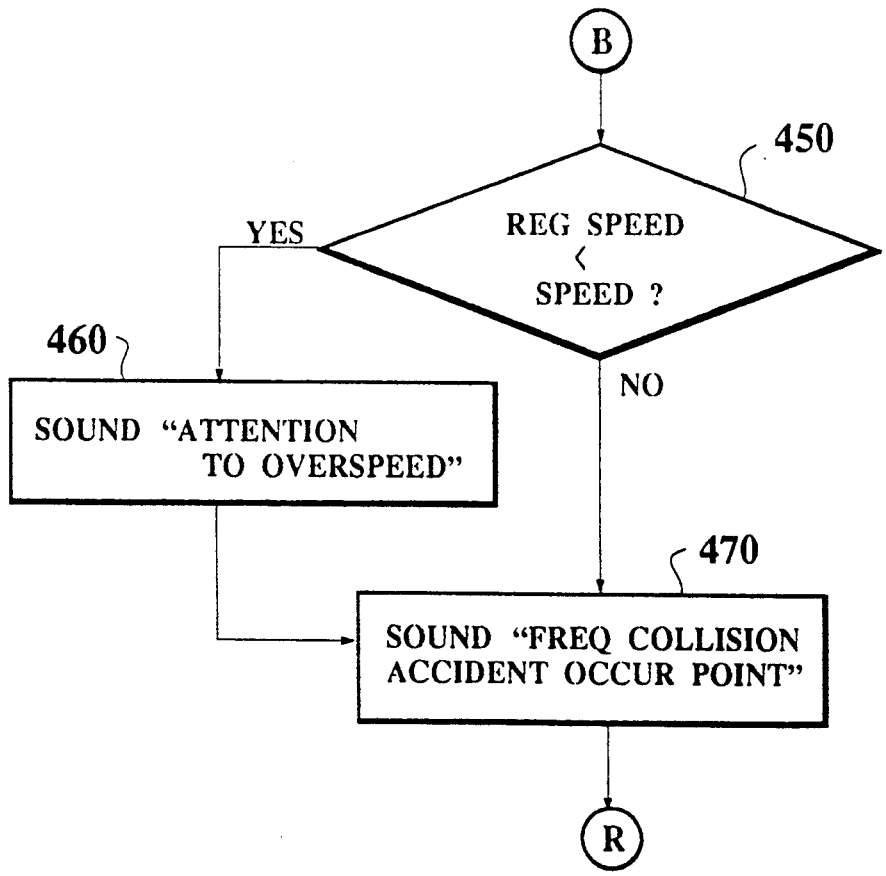
Figure 10:
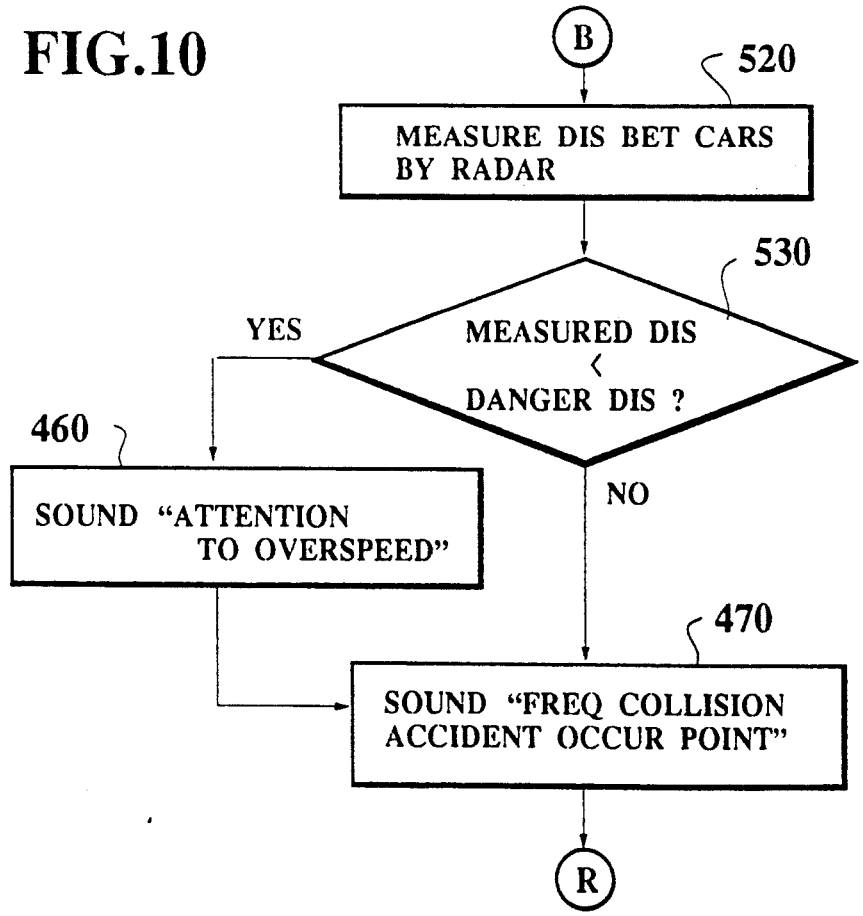

FIG. 10 shows a first modification of the first embodiment of the system shown in FIG. 4, in which a radar unit 112 as shown in FIG. 4 is further connected to the controller 111. In this modification, the step 450 shown in FIG. 8 is replaced with the steps 520 and 530 shown in FIG. 10.

In more detail, the control measures a distance between the vehicle and another vehicle traveling in the same lane by the radar unit 112 (in step 520), and further checks whether the measured distance between the two vehicles is shorter than a dangerous distance (in step 530). If the measured distance is longer than the dangerous distance, control generates an alarm "FREQUENT COLLISION ACCIDENT OCCURRENCE POINT"

through the speech outputting unit 107 (in step 470), returning to the original step 310. However, if the distance between the two vehicles is shorter than the dangerous distance, the control generates an alarm "ATTENTION TO OVERSPEED" or "ATTENTION TO SHORT DISTANCE BETWEEN CARS" (in step 460) and the alarm "FREQUENT COLLISION ACCIDENT OCCURRENCE POINT" (in step 470), returning to the original step 310.

Figure 11:
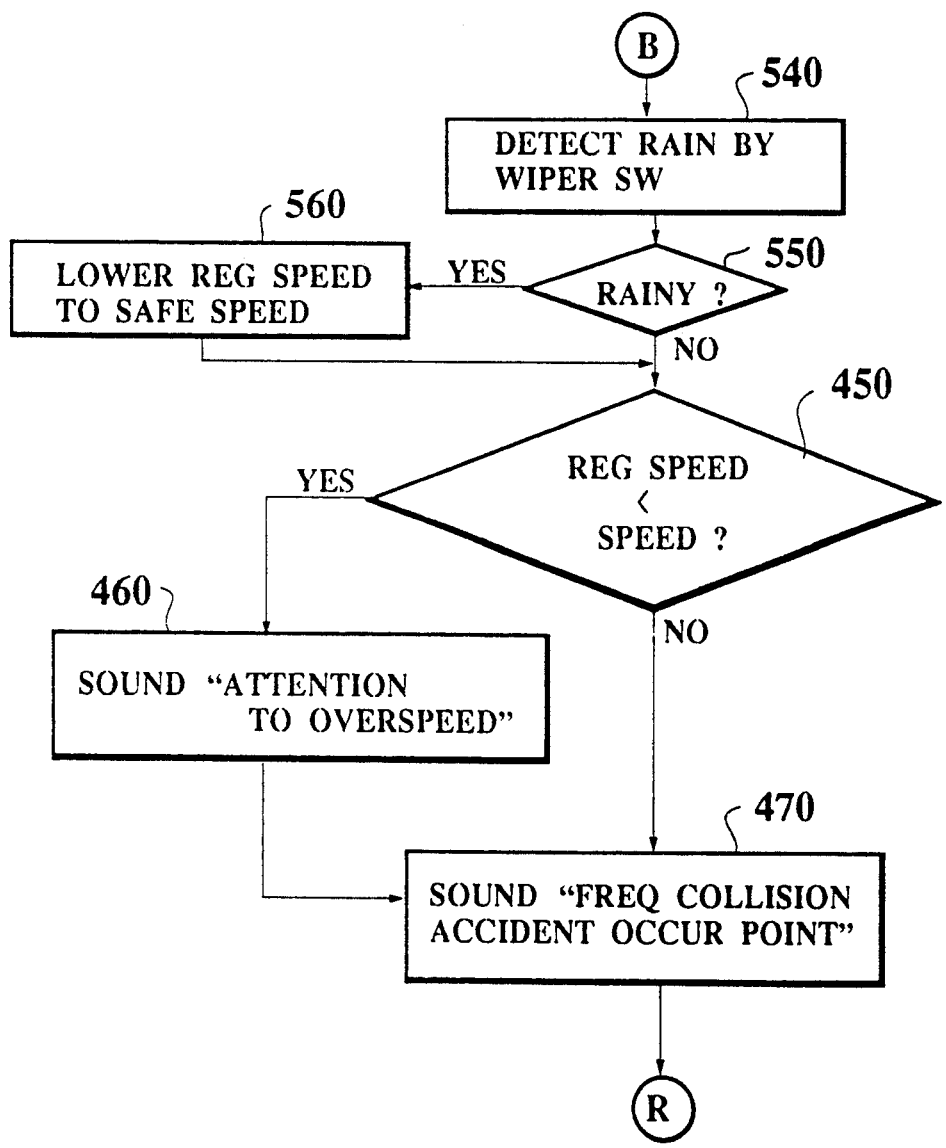

FIG. 11 shows a second modification of the first embodiment of the system shown in FIG. 4, in which a wiper switch (rainy weather sensor) 113 as shown in FIG. 4 is further connected to the controller 111. In this modification, new steps 540, 550 and 560 are additionally provided prior to the step 450 shown in FIG. 8.

In more detail, the control checks the turn-on or -off condition of a wiper switch (or a water sensor) (in step 540). If the wiper switch is turned on, control determines rainy weather (in step 550) and reduce the regulation speed (e.g. 60 km/h) down to a safe speed (e.g. 50km/h) (in step 560). Thereafter, control proceeds to the step 450 to compare the current vehicle speed with the reduced safe speed. If the vehicle speed is lower than the reduced safe speed, control generates an alarm "FREQUENT COLLISION ACCIDENT OCCURRENCE POINT" through the speech outputting unit 107 (in step 470), returning to the original step 310. If the current vehicle speed is higher than the reduced safe speed, control generates an alarm "ATTENTION TO OVERSPEED" through the speech outputting unit 107 (in step 460) and further the alarm "FREQUENT COLLISION ACCIDENT OCCURRENCE POINT" (in step 470), returning to the original step 310.

Figure 12:
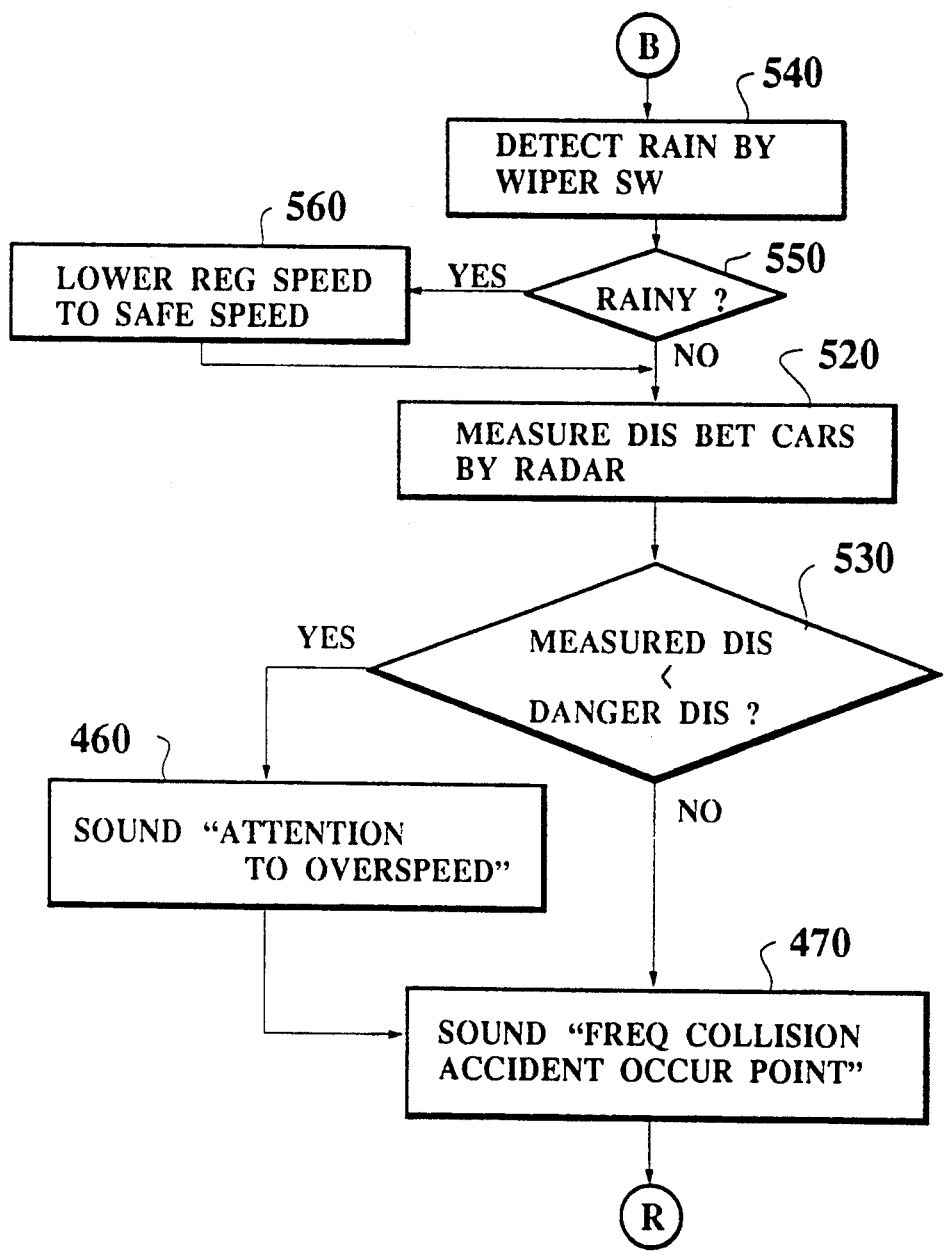

FIG. 12 is a third modification of the first embodiment of the system shown in FIG. 4, in which the functions of the first and second modifications shown in FIGS. 10 and 11 are incorporated in combination. That is, after the regulation speed is reduced down to a safe speed (in step 560) when rainy weather is detected (in step 540), a distance between two vehicles is measured by the radar unit (in step 520) and then the measured distance between the two vehicles is compared with the reduced dangerous distance (in step 530), before outputting the alarm.

Figure 13:
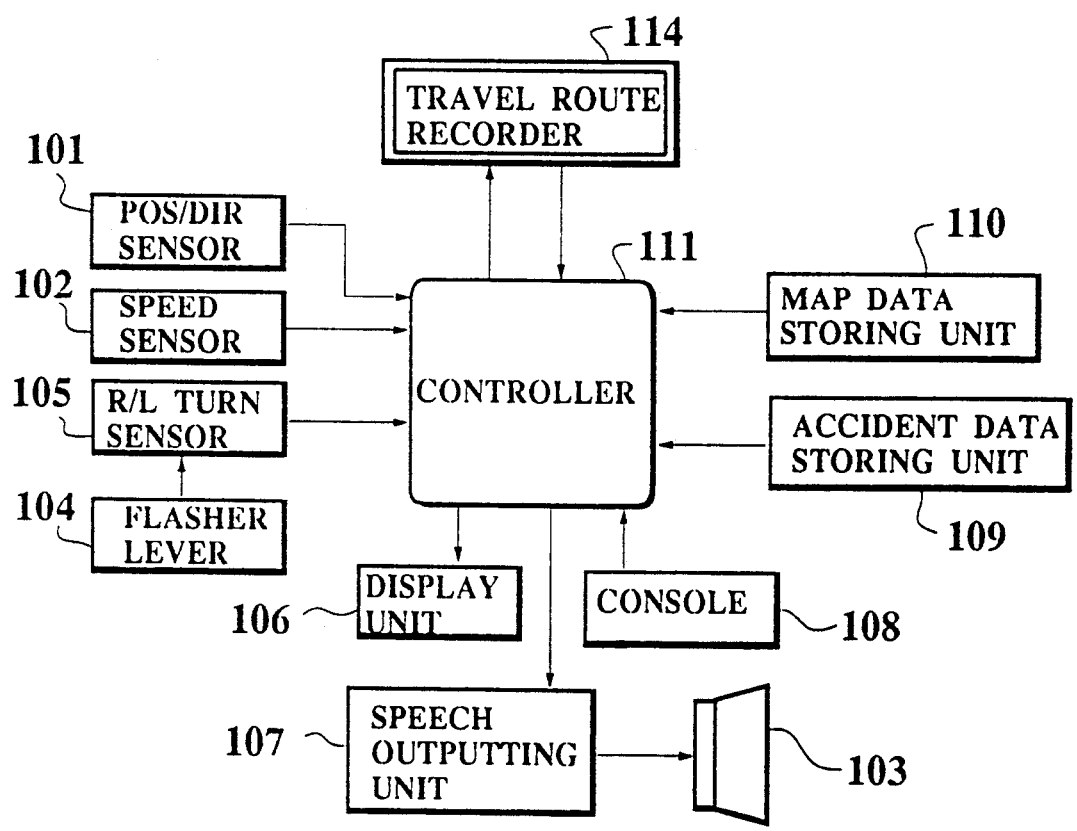
FIG. 13 is a more practical block diagram showing a second embodiment of the accident information providing system according to the present invention.

FIG. 13 shows a second embodiment of the system according to the present invention, in which a travel route recording unit 114 is additionally connected to the controller 111. The travel route recording unit 114 records the travel routes (roads and intersections) through which the vehicle has so far traveled on the basis of the current vehicle position and travel directions detected by the position and direction sensor 101, together with the number of travels, data, times, etc.

In this second embodiment, the current travel route is checked as to whether the route is the same as the recorded past travel route. If it is the same route, the number of travels recorded in the travel route recording unit 114 is checked. If the number of travels exceeds a predetermined value, the checked results are used to omit the generation of an alarm indicative of accident occurrence points, because the vehicle frequently travels along the same roads (as when the driver attends his office, for instance) and therefore it may be troublesome to repeatedly generate the same alarm every day on the same roads. In this case, however, it is preferable to display at least the alarm indication on the display unit 106.

Figure 14:
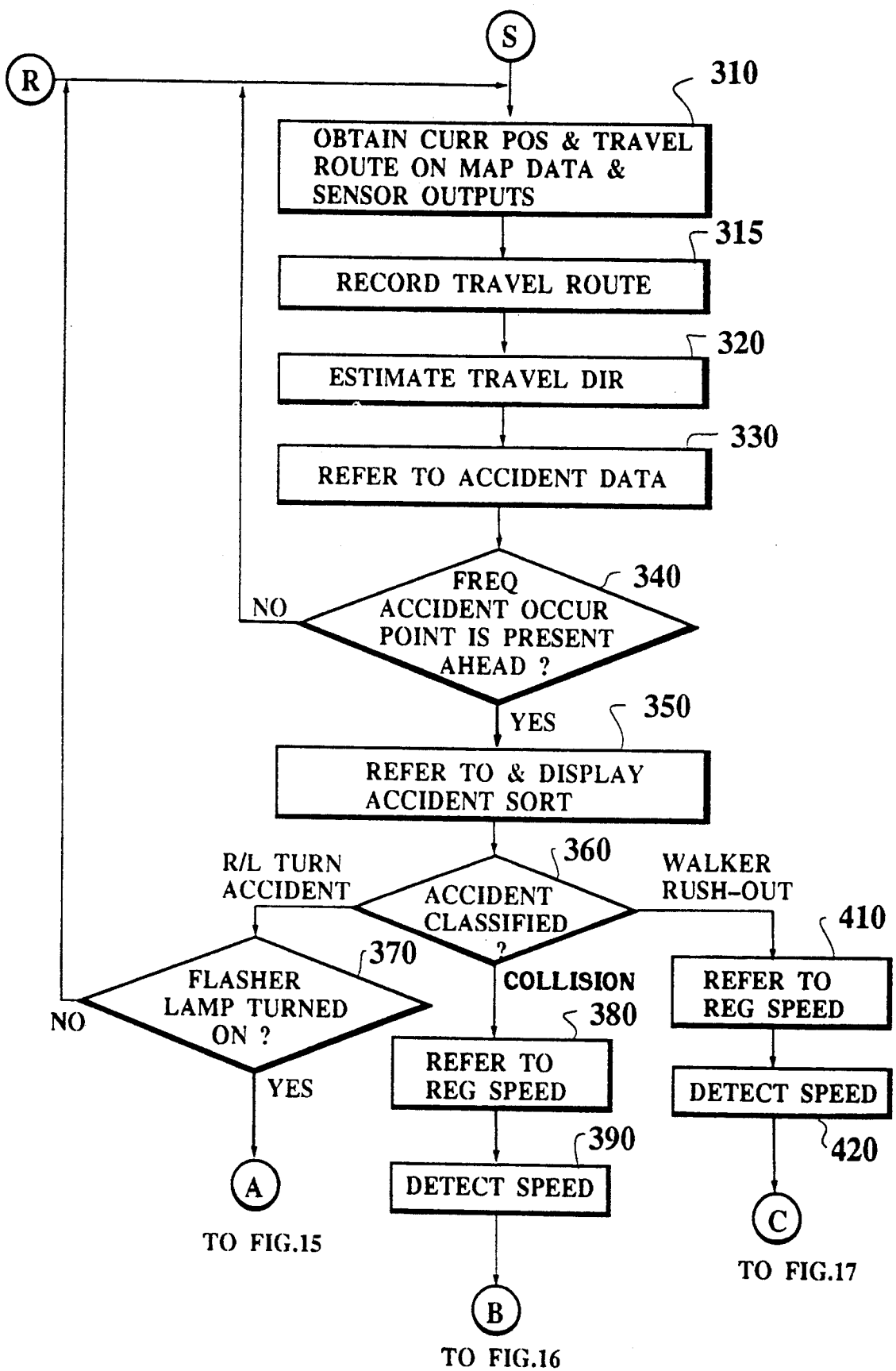
FIGS. 14 to 17 are flowcharts for assistance in explaining the function of the second embodiment of the system shown in FIG. 13.

FIG. 14 shows a flowchart related to the second embodiment, in which only the step 315 is additionally interposed between the steps 310 and 320 shown in FIG. 6. In this step 315, the control records the vehicle travel route obtained by the step 310 in the travel route recording unit 112.

Figure 7:
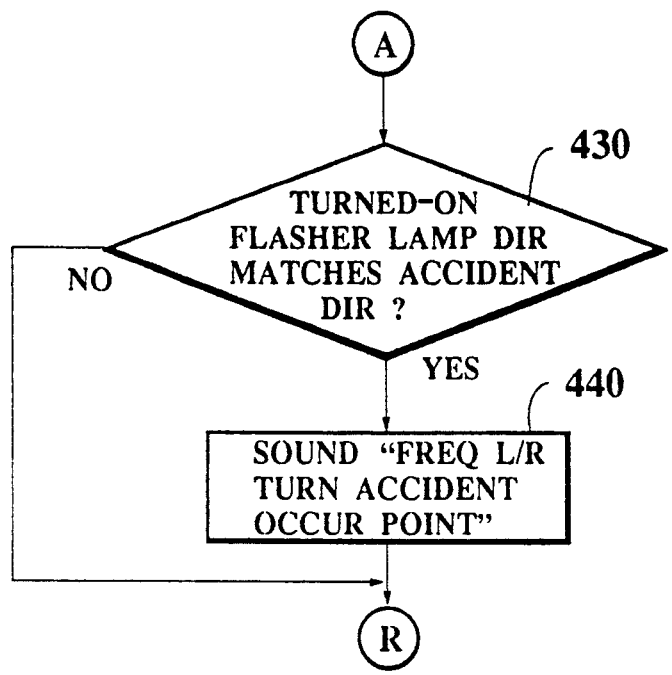
Figure 15:
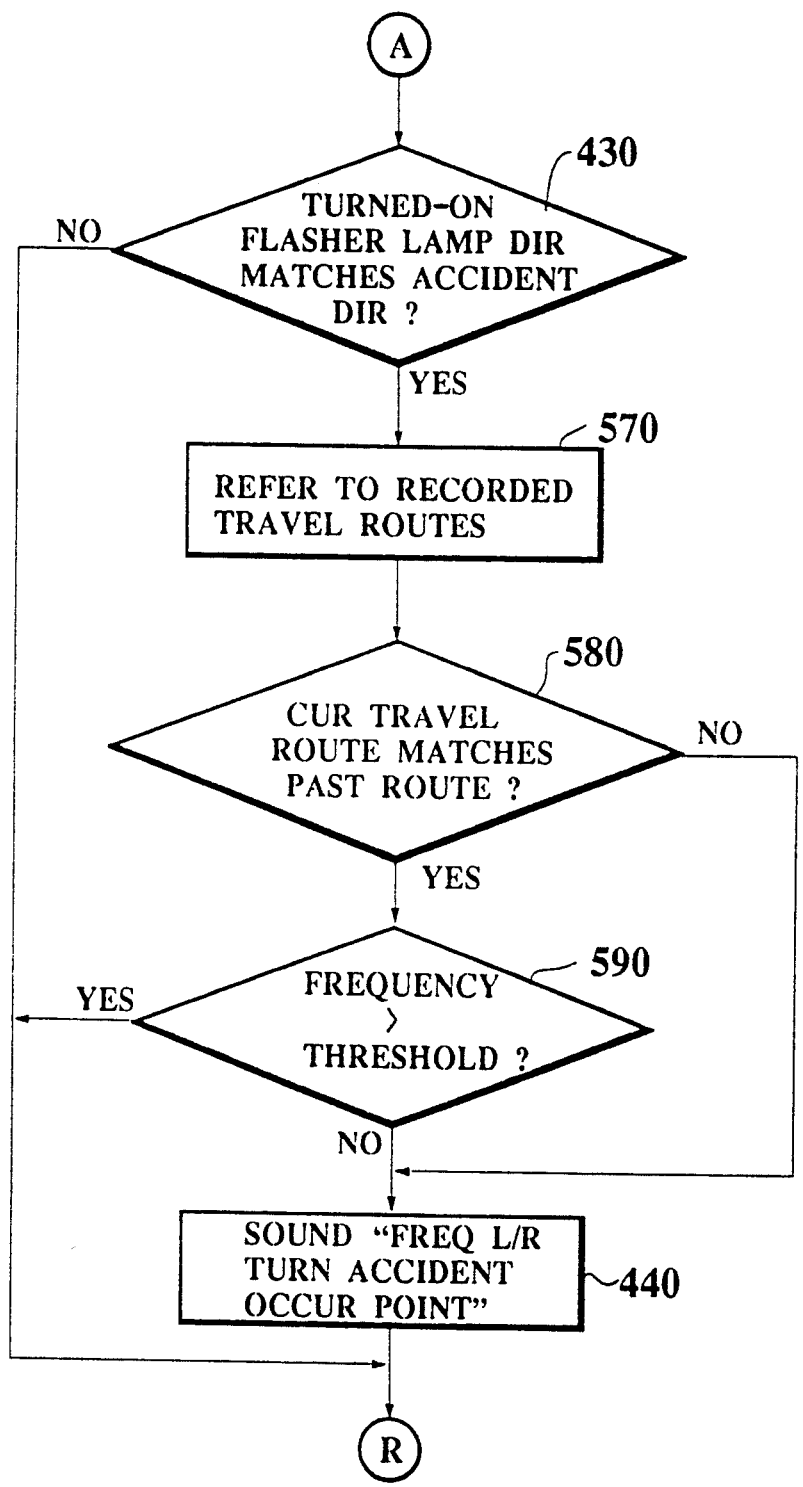

FIG. 15 shows a first discriminated result (right and left turn accident) of the second embodiment, in which steps 570, 580 and 590 are additionally provided between the steps 430 and 440 shown in FIG. 7.

In more detail, before generating an alarm (in step 440), the control refers to the data recorded in the travel route recording unit 112 (in step 570), and checks whether the vehicle has traveled through the frequent accident occurrence point before (in step 580). If YES, control checks whether the frequency of the past travels exceeds a predetermined threshold (in step 590). If YES, control returns to the original step 310, without generating the alarm "FREQUENT ACCIDENT OCCURRENCE POINT", because the driver already knows that accidents often arise along the road. If the frequency of the past travels is less than the predetermined threshold (in step 590), the control generates the alarm (in step 440) and returns to the original step 310, because the driver is not familiar with the frequent accident occurrence point.

Figure 16:
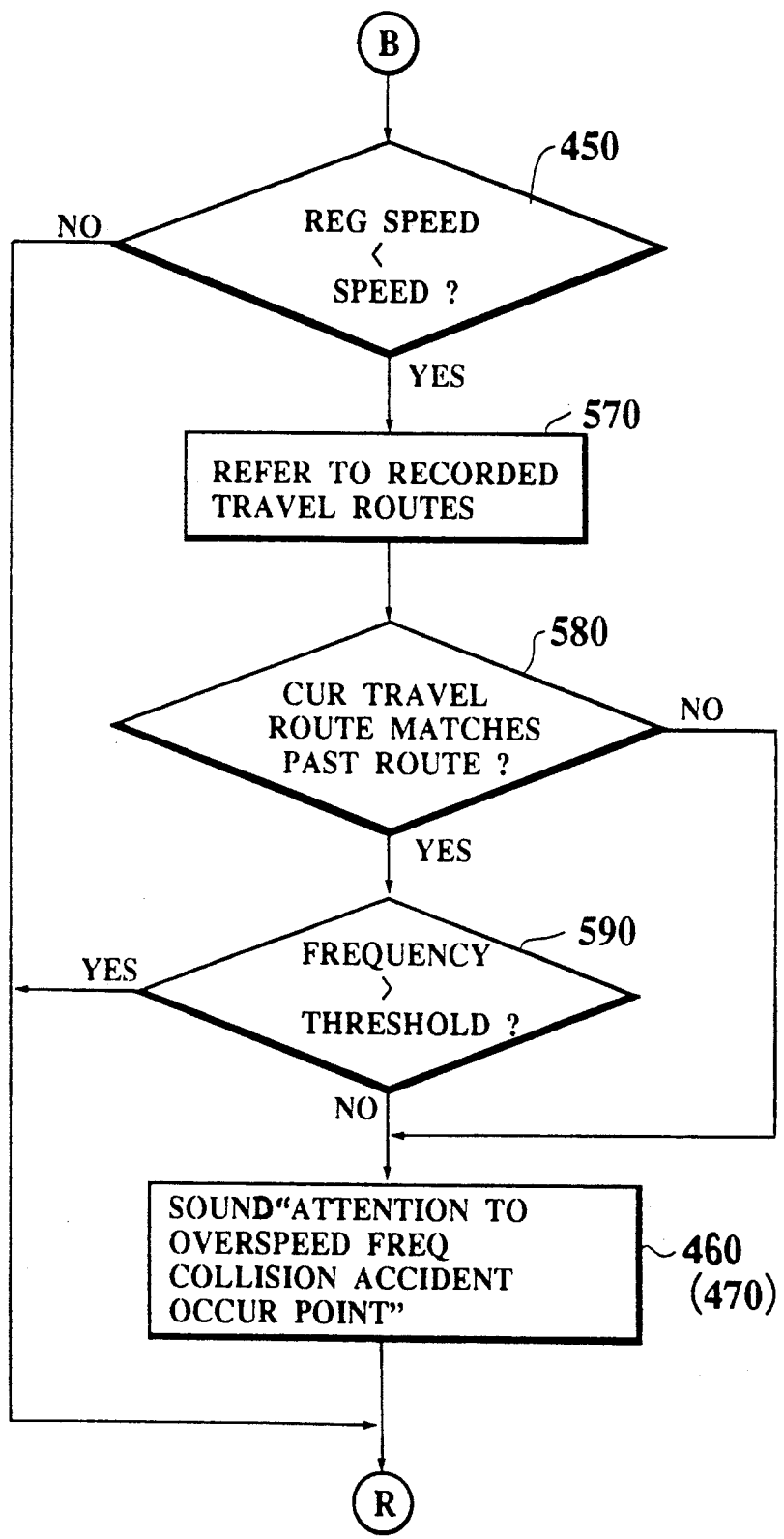

FIG. 16 shows a second discriminated accident (collision accident) of the second embodiment, in which steps 570, 580 and 590 are additionally provided between the steps 450 and 460 or 470 shown in FIG. 8. These steps 570, 580 and 590 are the same as explained with reference to FIG. 15. Further, in FIG. 16, the steps 460 and 470 shown in FIG. 8 are shown as one step. This is because it is preferable to generate an alarm of "ATTENTION TO OVERSPEED" when the travel frequency is small, even if the vehicle speed is lower than the regulation speed.

Figure 9:
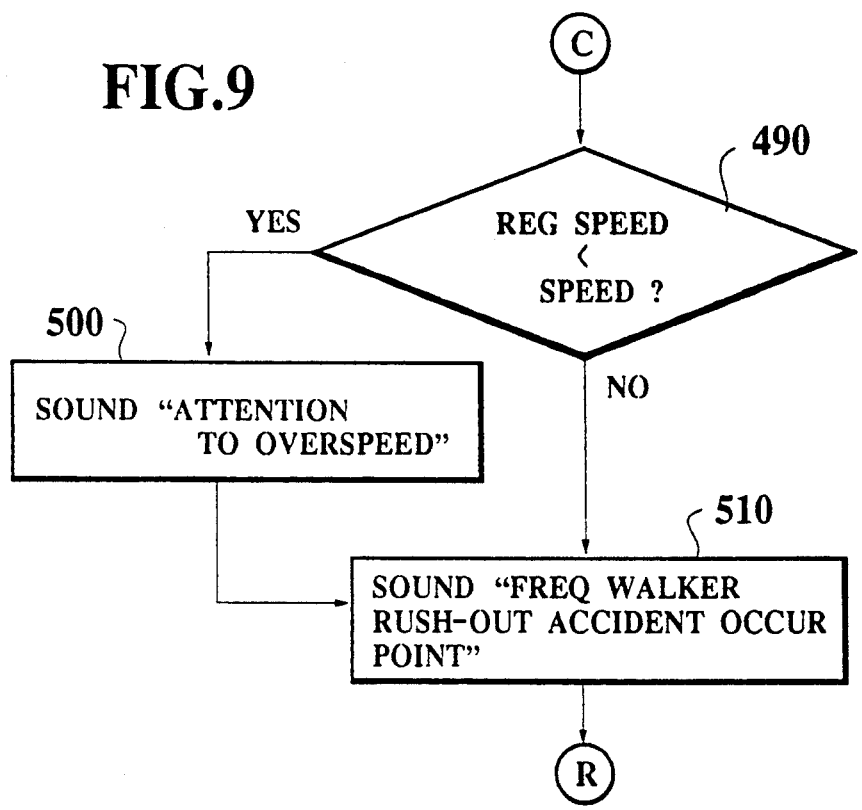
Figure 17:
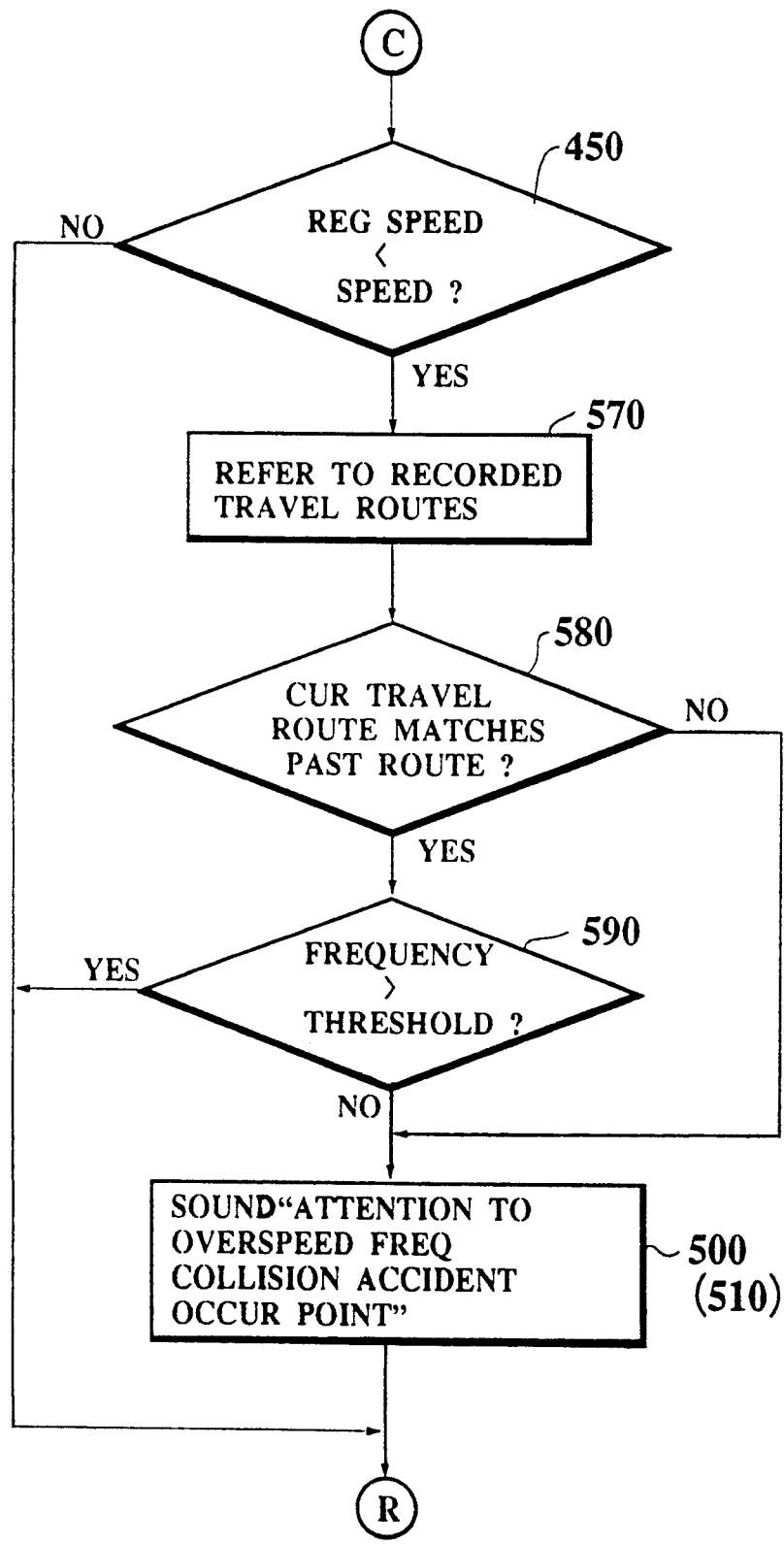

FIG. 17 shows a third discriminated result (walker rush-out accident) of the second embodiment, in which steps 570, 580 and 590 are additionally provided between the steps 490 and 500 or 510 shown in FIG. 9. These steps 570, 580, 590 are the same as explained with reference to FIG. 15. Further, in FIG. 17, the steps 500 and 510 shown in FIG. 9 are shown as one step, because of the same reason as already described with reference to FIG. 16.

Figure 18:
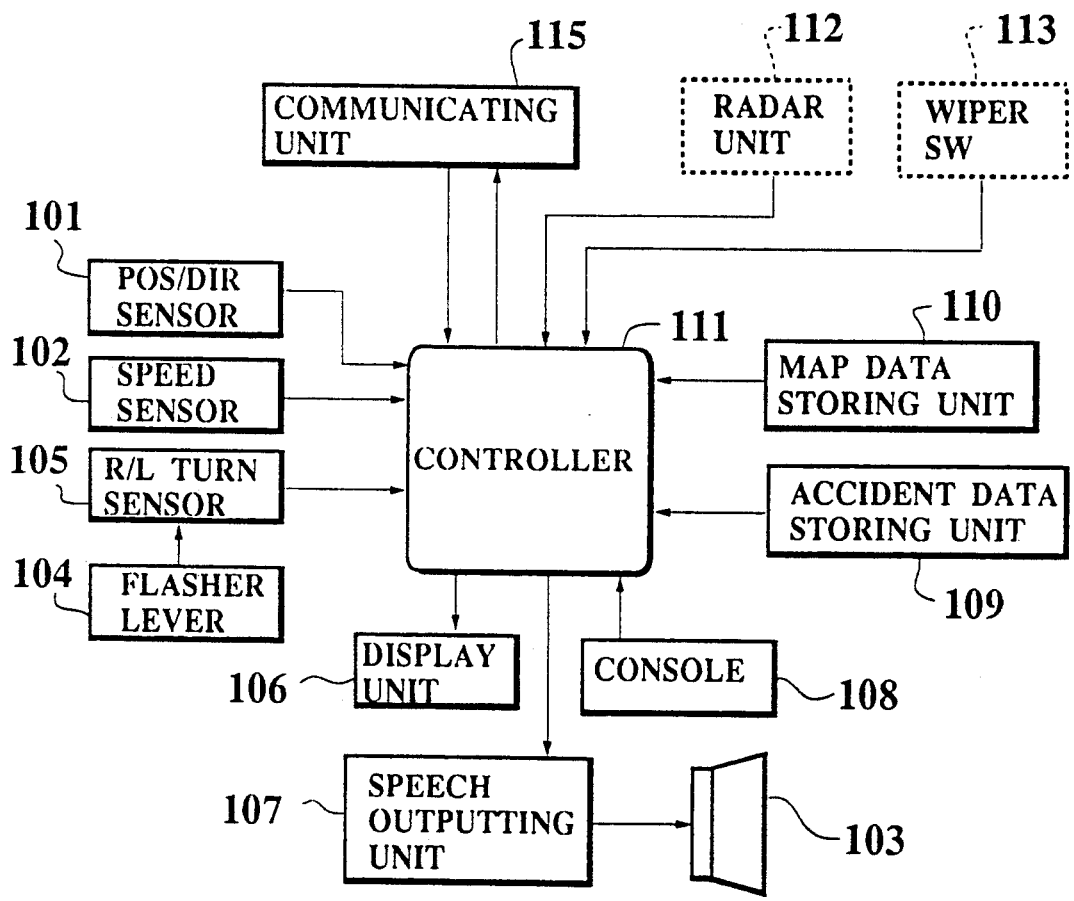
FIG. 18 is a more practical block diagram showing a third embodiment of the accident information providing system according to the present invention.

FIG. 18 shows a third embodiment of the system according to the present invention, in which a communicating unit (e.g. radio wave receiver/transmitter) 115 is further provided to transmit the positional and directional information of its own vehicle to other vehicles and receive the same information from another vehicle through radio communications. The radio communications can be achieved directly between vehicles or indirectly via fixed communication installations arranged along a road.

In this embodiment, the control discriminates whether there exists a possibility of a contact accident between its own vehicle and another vehicle traveling in the same direction on the basis of the positional and directional information of another vehicle received by the communicating unit 115, and alarms the driver of the presence of another vehicle when there exists a possibility of a contact accident.

Figure 19:
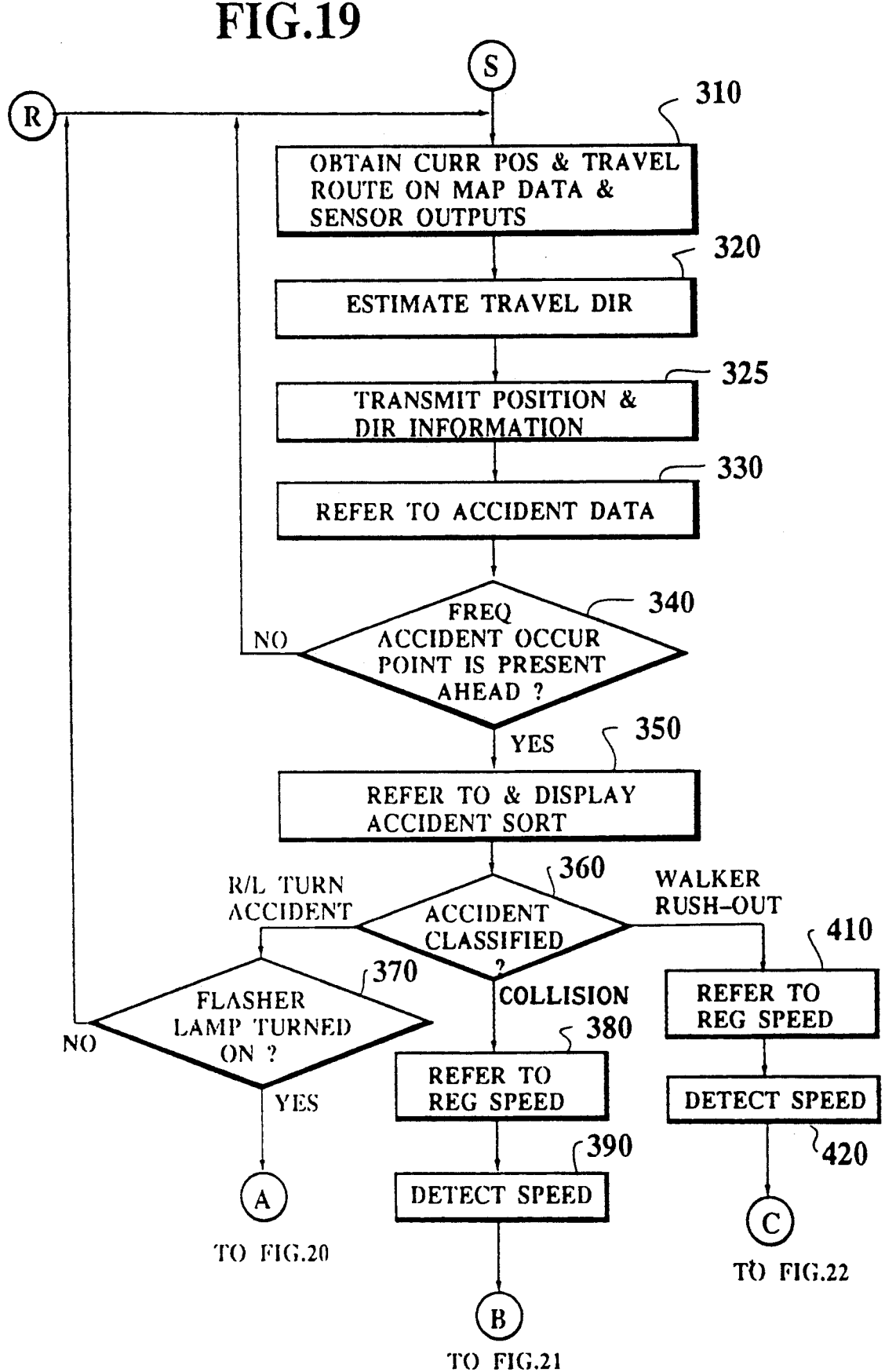
FIGS. 19 to 22 are flowcharts for assistance in explaining the function of the third embodiment of the system shown in FIG. 18.

FIG. 19 is a flowchart for assistance in explaining the third embodiment, in which only the step 325 is additionally interposed between the steps 320 and 330 shown in FIG. 6. In this step 325, the control transmits the current position data and travel direction data of its own vehicle detected by the steps 310 and 320 to other vehicles through the communicating unit 115.

Figure 20:
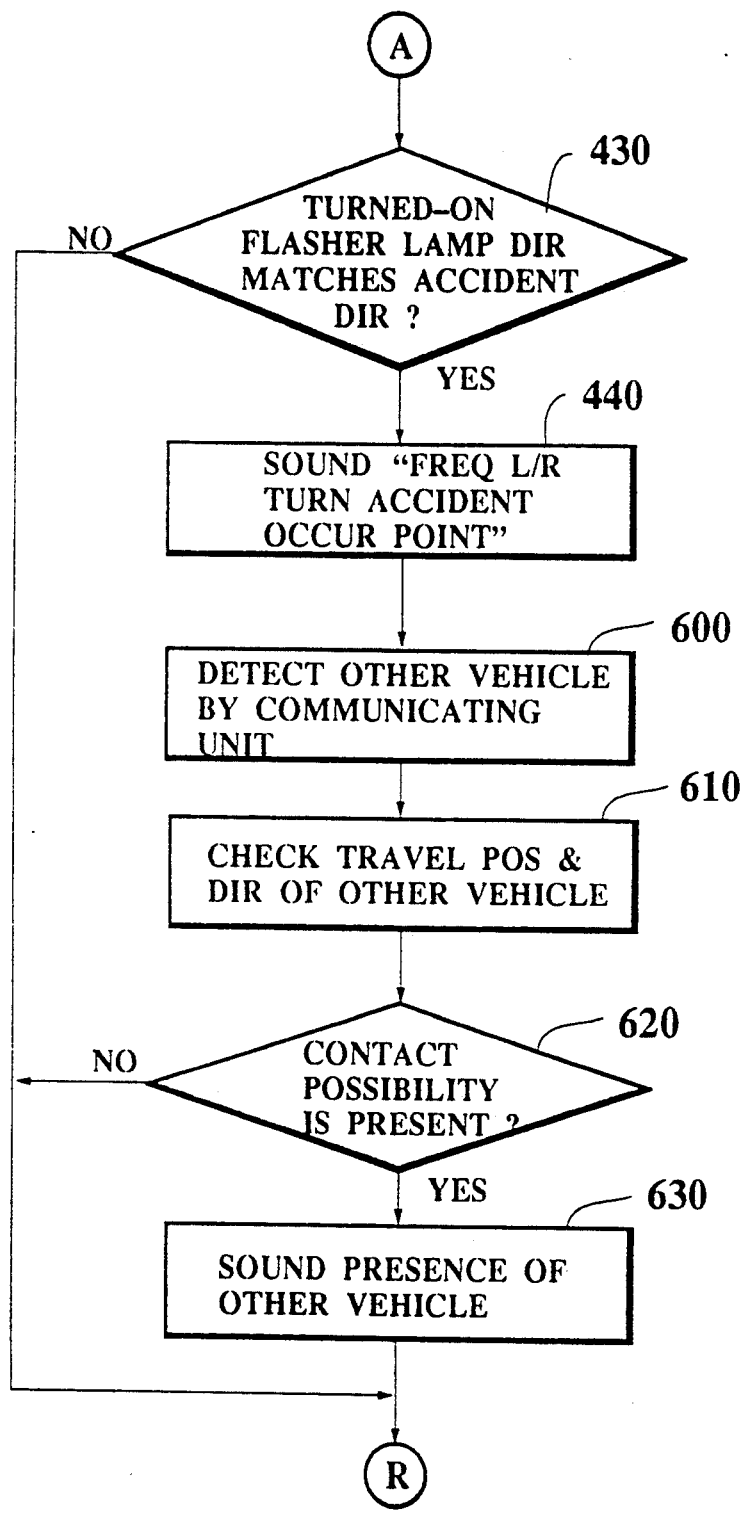

FIG. 20 shows a first discriminated result (right and left turn accident) of the third embodiment, in which steps 600, 610, 620 and 630 are additionally provided after the step 440 shown in FIG. 7. In more detail, after an alarm of "FREQUENT R/L TURN ACCIDENT OCCURRENCE POINT" has been outputted through the speech outputting unit 107 (in step 440), the control detects the presence of another vehicle through the communicating unit 115 (in step 600), checks the travel position and direction of the other vehicle (in step 610), discriminates the presence or absence of the possibility of a contact accident between its own vehicle and the other vehicle on the basis of the detected travel position and direction of the other vehicle (in step 620), and informs the driver, of the presence of a contact possibility between the two vehicles if accident possibility exists (in step 630). Here, it is possible to consider various methods of informing the driver of a contact possibility as follows: an alarm "ATTENTION TO ANOTHER APPROACHING CAR" or "CONTACT POSSIBILITY" can be indicated to the driver through the speech outputting unit 107; a buzzer can be sounded; a lamp can be blinked; an alarm can be indicated on the display unit 106; the seat belt of the driver can be wound up a little; a vibrator provided on a driver seat can be actuated; etc.

Figure 21:
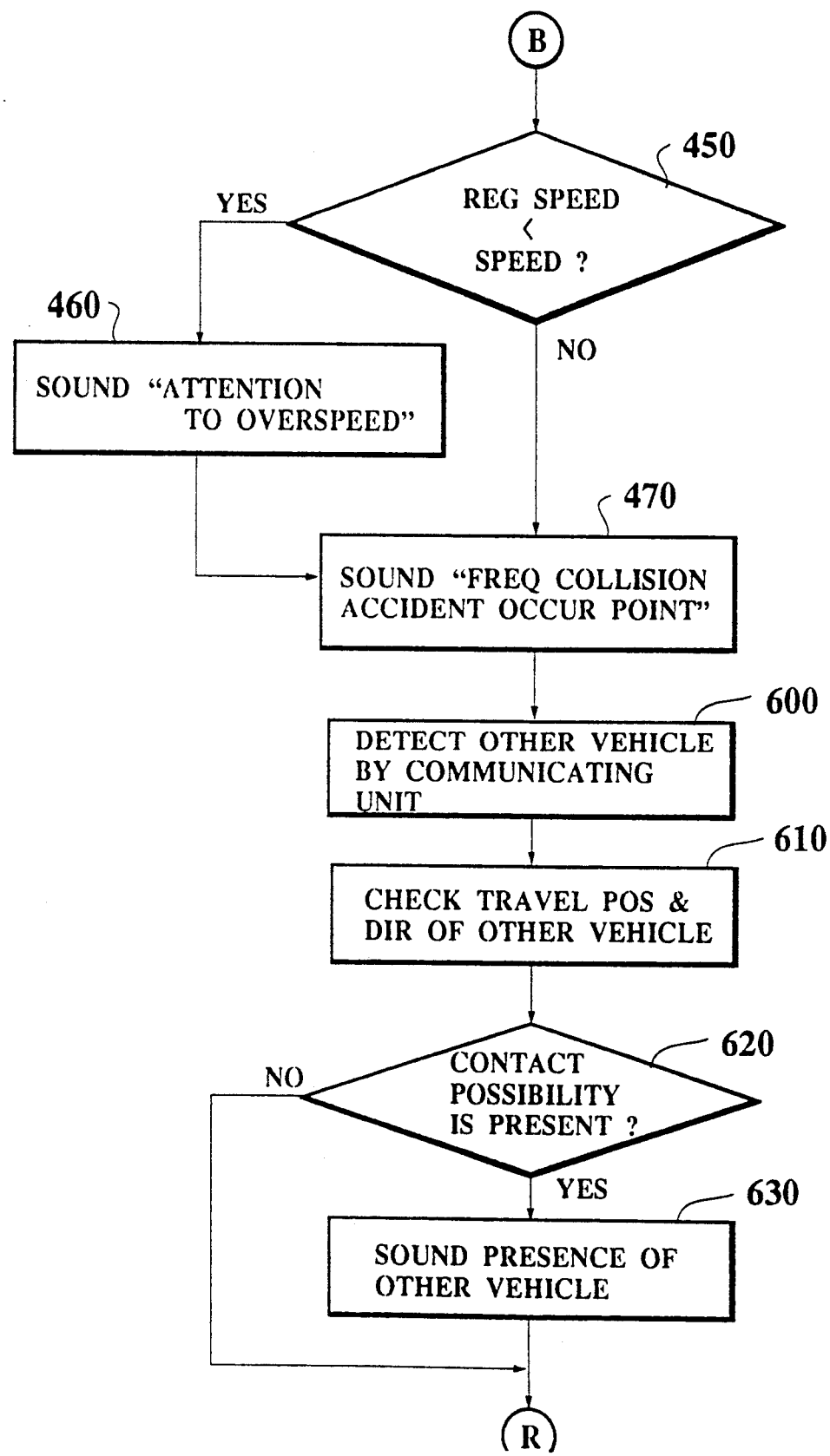

FIG. 21 shows a second discriminated result (collision accident) of the third embodiment, in which the steps 600, 610, 620 and 630 are additionally provided after the steps 470 shown in FIG. 8. That is, after an alarm of "FREQUENT COLLISION ACCIDENT OCCURRENCE POINT" has been outputted through the speech outputting unit 107 (in step 470), the control informs the driver of the presence of contact accident possibility between the two vehicles, if it exists (in step 630).

Figure 22:
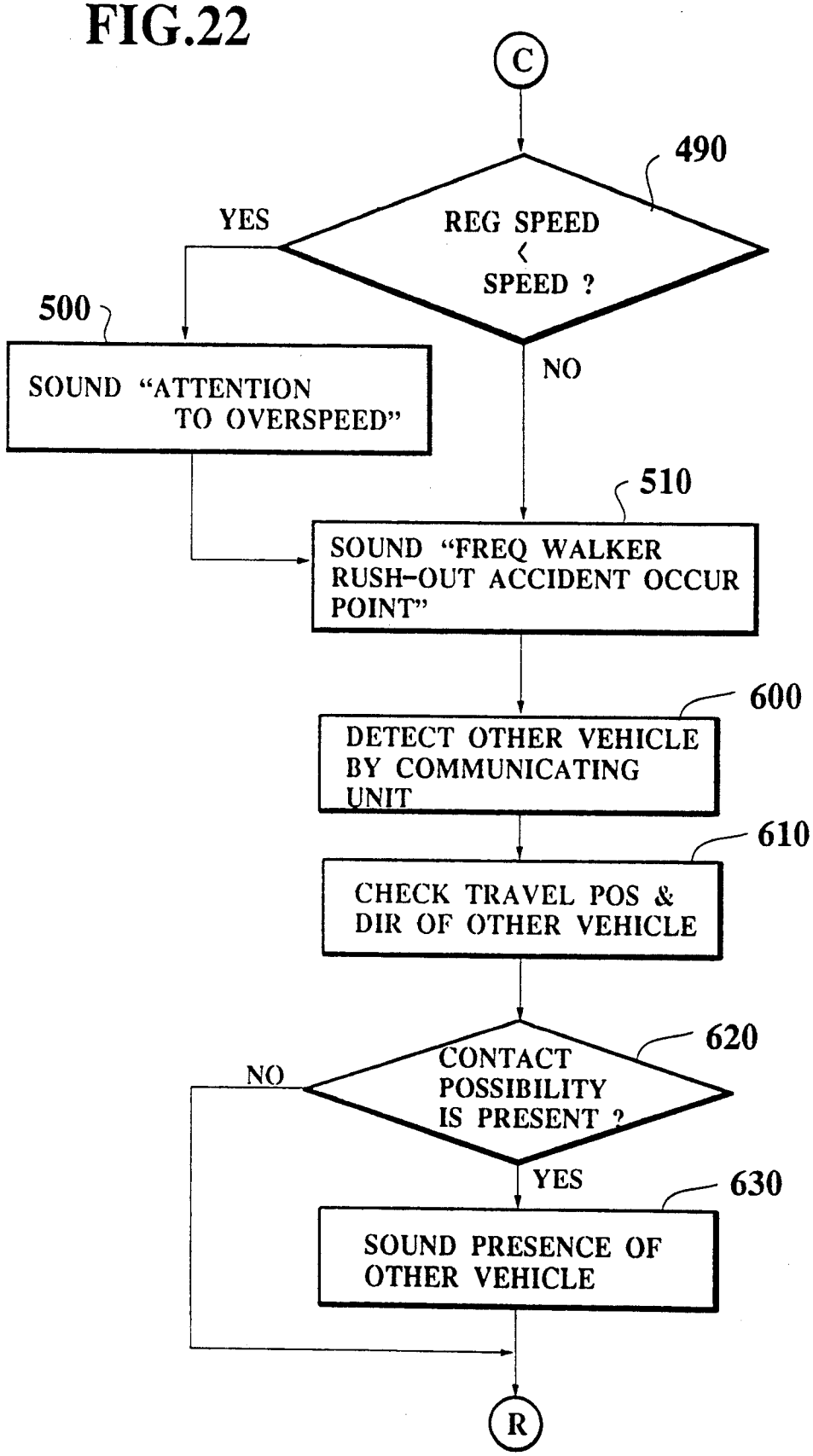

FIG. 22 shows a third discriminated result (walker rush-out accident) of the third embodiment, in which the steps 600, 610, 620 and 630 are additionally provided after the step 510 shown in FIG. 9. That is, after an alarm of "FREQUENT WALKER RUSH-OUT ACCIDENT OCCURRENCE POINT" has been outputted through the speech outputting unit 107 (in step 510), the control informs the driver of the presence of contact accident possibility between the two vehicles, if it exists (in step 630).

Figure 23:
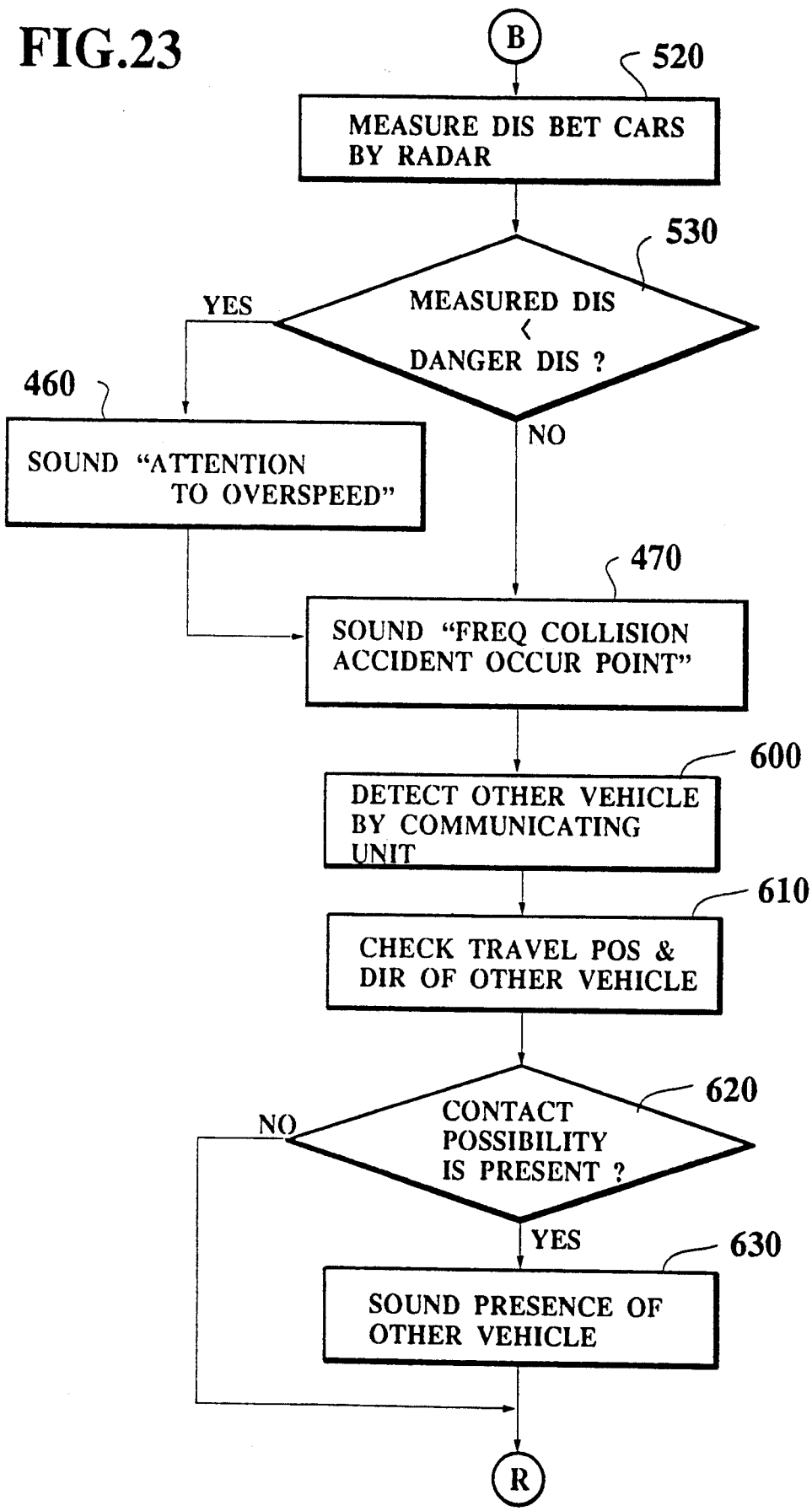
FIGS. 23 to 25 are flowcharts for assistance in explaining the function of several modifications of the third embodiment of the system according to the present invention.

FIG. 23 shows another modification of the third embodiment, in which the steps 600, 610, 620, and 630 are additionally provided after the step 470 shown in FIG. 10. That is, a radar unit 112 is further connected to the controller 111 to detect a distance between two cars traveling in the same lane as shown in FIG. 18.

After an alarm of "FREQUENT COLLISION ACCIDENT OCCURRENCE POINT" has been outputted (in step 470), the control informs the driver of the presence of a contact accident possibility between the two vehicles, if it exists (in step 630).

Figure 24:
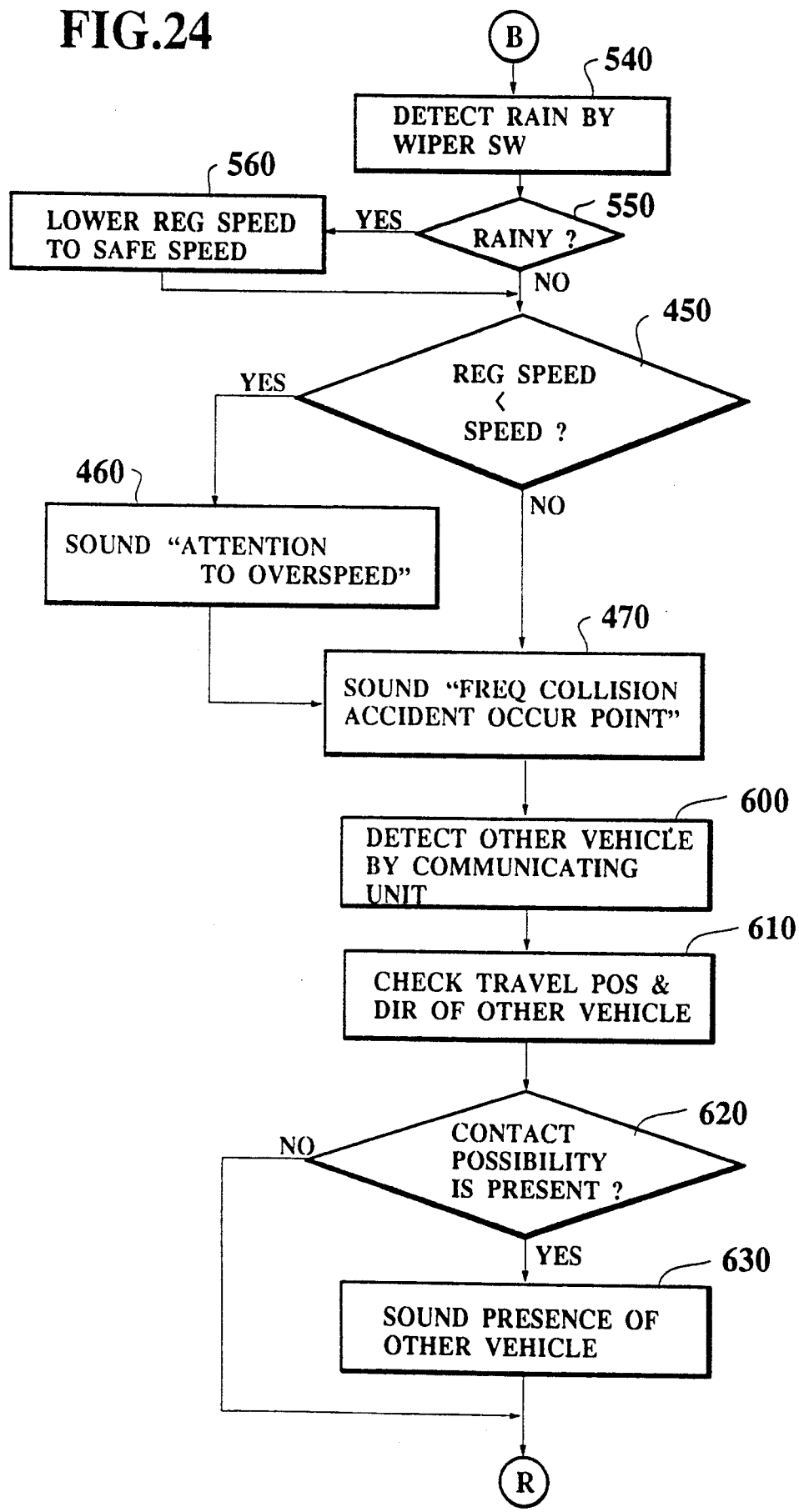

FIG. 24 shows still another modification of the third embodiment, in which steps 600, 610, 620 and 630 are additionally provided after the step 470 shown in FIG. 11. That is, a wiper switch 113 is further connected to the controller 111 to detect rainy weather as shown in FIG. 18.

After an alarm of "FREQUENT COLLISION ACCIDENT OCCURRENCE POINT" has been outputted (in step 470), the control informs the driver of the presence of a contact accident possibility between the two vehicles, if exists (in step 630).

Figure 25:
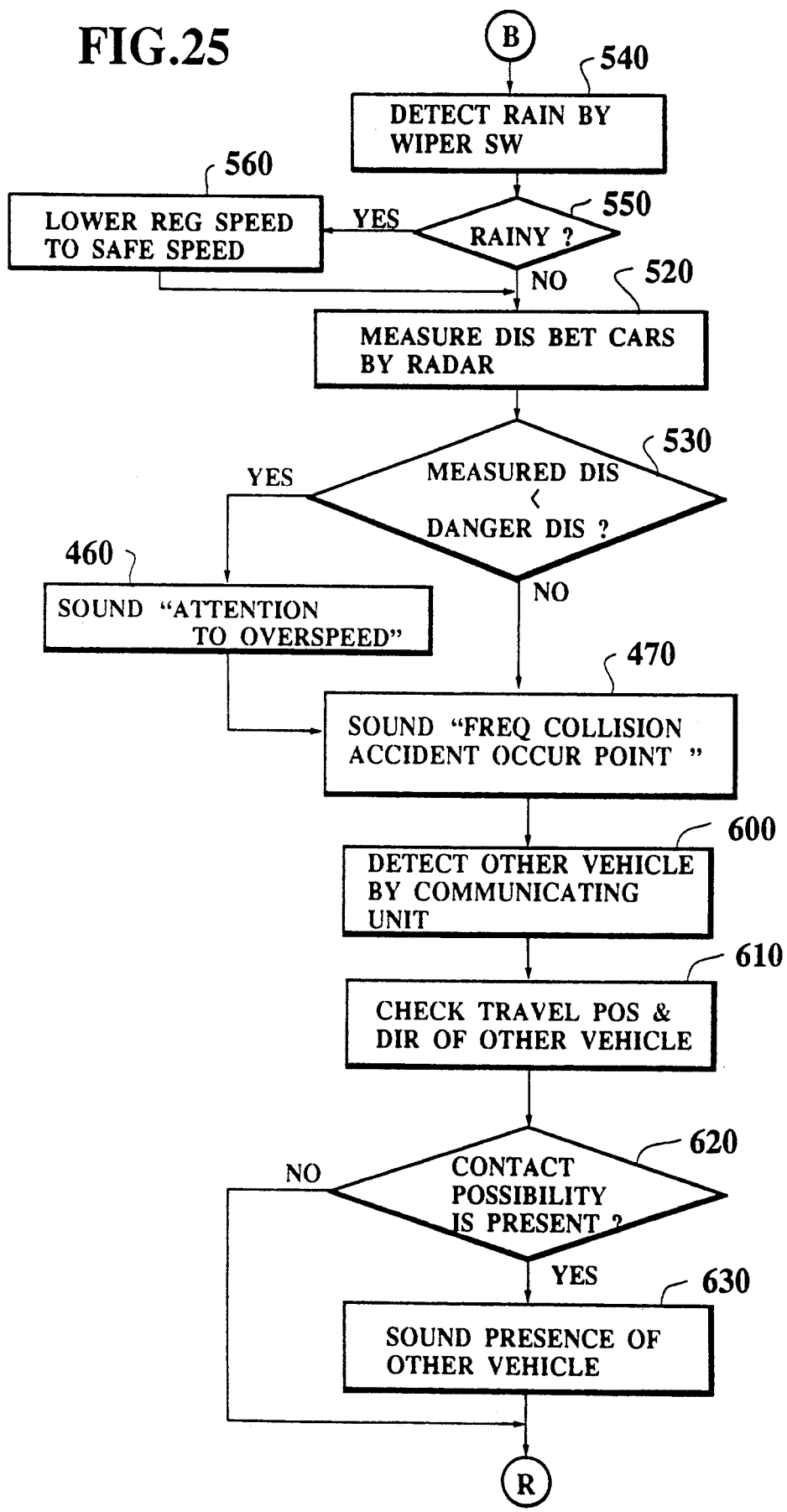

FIG. 25 shows another modification of the third embodiment, in which both the functions of the above two modifications are combined. That is, the radar unit 112 and the wiper switch 113 are further connected to the controller 111 to detect a distance between two cars and rainy weather as shown in FIG. 18. After an alarm of "FREQUENT COLLISION ACCIDENT OCCURRENCE POINT" has been outputted (in step 470) the control informs the driver of the presence of a contact accident possibility, if exists (in step 630).

Further, the collision accident can be divided into head-on collision accident and rear-end collision accident. In the third embodiment shown in FIG. 18, because the communicating unit 115 which can detect the positional and directional information of other vehicles is provided, it is possible to discriminate whether the collision possibility is head-on collision or rear-end collision. In more detail, when the positional and directional relationship, between two vehicles traveling on two opposite lanes or in opposite direction is checked, it is possible to output an on alarm of head-on collision accident. On the other hand, when the positional and directional relationship between two vehicles traveling in the same lane or in the same direction in checked, it is possible to output an alarm of rear-end collision accident.

As described above, in the accident information providing system, according to the present invention, past data of traffic accidents which occurred on roads (ahead of the road on which the vehicle is now traveling) are extracted from the accident data storing means, the possibility of an accident similar to the past accident is discriminated on the basis of the vehicle driving conditions (right and left turn, speed); and accident information is given to the driver. Therefore, the driver can drive the vehicle with sufficient precaution on the basis of the accident-related information, thus improving the vehicle traveling safety.

Further, when the vehicle often travels along the same roads, because the drive is familiar with the situation of accident occurrence and further frequent alarms are rather troublesome to the driver, the alarm generation can be disabled under a certain condition.

Further, when the vehicles are provided with a communicating units, respectively, because the positional and directional data of other vehicles can be detected by its own vehicle, it is possible to further output an alarm of the possibility of a contact accident between two adjacent vehicles traveling in the same direction.

Further, in the above embodiment, only an accident alarm is generated or displayed when there exists a possibility of occurrence of a traffic accident. However, it is, of course, possible to more positively prevent a traffic accident by automatically braking the vehicle, whenever there exists a possibility of accident occurrence.

What is claimed is:

1. An accident information providing system for an automotive vehicle, comprising:
   (a) vehicle position and direction detecting means for detecting current vehicle traveling position and direction;
   (b) accident data storing means for storing past traffic accident data under classifications of occurrence locations and causes;

(c) accident data extracting means for extracting past accident data related to roads ahead of a current travel road, determined on the basis of the detected current vehicle traveling position and direction, from said storing means;

(d) drive condition detecting means for detecting vehicle driving conditions;

(e) accident occurrence discriminating means for discriminating a possibility of occurrence of an accident similar to a past accident extracted by said extracting means, on the basis of vehicle driving conditions detected by said drive condition detecting means; and (f) alarming means for providing an accident-related alarm to a driver when said discriminating means discriminates the possibility of the accident occurrence.

2. The accident information providing system of claim 1, which further comprises:

(a) map data storing means for storing road map information related to roads and intersections;

(b) travel route recording means for recording the number of travels through roads and intersections recorded in said map data storing means, on the basis of the detected current vehicle traveling position and direction; and (c) alarm necessity discriminating means for comparing the recorded number of travels with a predetermined value to discriminate the lack of a need of providing the accident-related alarm to the driver when the recorded travel number exceeds the predetermined value.

3. The accident information providing system of claim 1, which further comprises another vehicle detecting means for detecting traveling position and direction of another vehicle traveling in the vicinity of the vehicle, said another vehicle detecting means discriminating a possibility of occurrence of a contact accident between the vehicle and said another vehicle traveling in the same direction, and providing an alarm to the driver when the distance between the two vehicles is less than a predetermined value.

4. The accident information providing system of claim 1, wherein said drive condition detecting means is a vehicle speed sensor.

5. The accident information providing system of claim 1, wherein said drive condition detecting means is a right/left turn sensor associated with a flasher lever.

6. The accident information providing system of claim 1, which further comprises means for detecting vehicle speed; and a radar unit for detecting a distance between the vehicle and another vehicle, said accident occurrence discriminating means discriminating a possibility of occurrence of a collision accident when the detected distance between the two vehicles is less than a predetermined value according to the vehicle speed detected by said speed detecting means.

7. The accident information providing system of claim 1, which further comprises a wiper switch for detecting rainy weather, said accident occurrence discriminating means discriminating a possibility of accident occurrence when a current driving condition either one of exceeds or is less than a predetermined value of a like driving condition, and by using a predetermined value which results in an earlier discrimination of possible accident occurrence when said wiper switch detects rainy weather.

8. The accident information providing system of claim 3, wherein said another vehicle detecting means is a communicating unit for transmitting the current vehicle traveling position and direction of the vehicle to other vehicles and receiving current vehicle traveling positions and directions of other vehicles.

9. A method of providing accident information to a driver, comprising the steps of:

(a) calculating current vehicle position and current vehicle travel route on the basis of map data and travel position and direction sensor outputs;

(b) estimating vehicle travel direction;

(c) referring to accident data related to the estimated vehicle travel direction to check whether a frequent accident occurrence point exists ahead of the current vehicle position;

(d) if the frequent accident occurrence point exists, referring to the accident data to check a type of past accident which occurs at the frequent accident occurrence point;

(e) detecting vehicle driving conditions;

(f) checking whether the detected vehicle driving conditions are dangerous by comparing the detected conditions with the checked type of past accident; and (g) if the detected conditions are dangerous, outputting an accident alarm.

10. The method of providing accident information of claim 9, wherein:

(a) if the checked type of past accident is a right/left accident in step (d) of claim 9, detecting whether a flasher lamp is turned on;

(b) if the flasher lamp is turned on, checking whether the turned-on flasher lamp direction matches a turn-accident direction of the checked type of past accident; and (c) if the turned-on flasher lamp direction matches the turn-accident direction, outputting a turn-accident alarm.

11. The method of providing accident information of claim 9, wherein:

(a) if the checked type of past accident is a collision accident in step (d) of claim 9, referring to a regulation speed;

(b) detecting current vehicle speed;

(c) checking whether the current speed is higher than the regulation speed; and (d) if the current speed is higher, outputting an overspeed alarm and a collision accident alarm.

12. The method of providing accident information of claim 9, wherein:

(a) if the checked type of past accident is a walker rush-out accident in step (d) of claim 9, referring to a regulation speed;

(b) detecting current vehicle speed;

(c) checking whether the current speed is higher than the regulation speed; and (d) if the current speed is higher, outputting an overspeed alarm and a walker rush-out accident alarm.

13. The method of providing accident information of claim 11, which further comprises the steps of:

(a) measuring a distance between the vehicle and another vehicle;

(b) checking whether the measured distance is shorter than a predetermined dangerous distance according to vehicle speed; and (c) if the measured distance is shorter, outputting an overspeed alarm and a collision accident alarm.

14. The method of providing accident information of claim 12, which further comprises the steps of:
   (a) checking whether the weather is rainy by use of a wiper switch; and
   (b) if the weather is rainy, reducing the regulation speed to a lower speed, before checking whether the current speed is higher than the regulation speed.

15. The method of providing accident information of claim 9, which further comprises the steps of:
   (a) recording past vehicle travel routes;
   (b) referring to the recorded past travel routes;
   (c) checking whether the current travel route matches one of the recorded past travel routes;
   (d) if the current travel route matches one of the recorded past travel routes, checking whether the number of recorded past travel routes exceeds a predetermined value; and
   (e) if the number of recorded past travel routes exceeds the predetermined value, outputting no accident alarm.

16. The method of providing accident information of claim 9, which further comprises the steps of:
   (a) transmitting vehicle travel position and direction information of the vehicle to other vehicles and receiving vehicle travel position and direction information of other vehicles;
   (b) checking the travel positions and directions of other vehicles;
   (c) checking whether there exists a possibility of contact accident between the vehicle and another vehicle traveling in the same direction on the basis of the two vehicles' travel position an direction information; and
   (d) if a possibility of contact accident exists, outputting another vehicle presence alarm to the driver, in addition to an accident alarm.

* * * * *